United States Patent
Higa et al.

(10) Patent No.: US 9,266,069 B2
(45) Date of Patent: Feb. 23, 2016

(54) ION-EXCHANGE MEMBRANE AND METHOD FOR PRODUCING SAME

(75) Inventors: Mitsuru Higa, Ube (JP); Atsushi Jikihara, Kurashiki (JP); Kenichi Kobayashi, Kurashiki (JP); Naoki Fujiwara, Kurashiki (JP)

(73) Assignees: YAMAGUCHI UNIVERSITY, Yamaguchi-shi (JP); KURARAY CO., LTD., Kurashiki-shi (JP)

( * ) Notice: Subject to any disclaimer, the term of this patent is extended or adjusted under 35 U.S.C. 154(b) by 1052 days.

(21) Appl. No.: 13/264,233

(22) PCT Filed: Apr. 13, 2010

(86) PCT No.: PCT/JP2010/056566
§ 371 (c)(1),
(2), (4) Date: Oct. 13, 2011

(87) PCT Pub. No.: WO2010/119858
PCT Pub. Date: Oct. 21, 2010

(65) Prior Publication Data
US 2012/0031834 A1 Feb. 9, 2012

(30) Foreign Application Priority Data

Apr. 13, 2009 (JP) .................................. 2009-097076
Apr. 13, 2009 (JP) .................................. 2009-097077

(51) Int. Cl.
*B01D 39/00* (2006.01)
*B01D 39/14* (2006.01)
(Continued)

(52) U.S. Cl.
CPC ............... *B01D 69/10* (2013.01); *B01D 61/44* (2013.01); *B01D 67/0013* (2013.01); *C08J 5/2206* (2013.01); *B01D 2323/30* (2013.01); *C08J 2329/04* (2013.01)

(58) Field of Classification Search
CPC ............ C08F 212/14; C08F 8/44; C08F 8/36; C08F 212/08; C08F 212/36; C08F 8/30; C08F 226/08; C08F 226/06; C08F 8/40; C08F 8/42; C08F 12/18; C08F 8/14; C08F 16/06; C08F 216/06; C08F 2/20
USPC ................ 210/490, 500.42, 500.27; 427/243, 427/407.1; 521/27
See application file for complete search history.

(56) References Cited

U.S. PATENT DOCUMENTS 3,821,127 A    6/1974  Mizutani et al.
4,012,324 A *  3/1977  Gregor ..................... 210/500.37
(Continued)

FOREIGN PATENT DOCUMENTS

CN    1235061 A     11/1999
CN    101330149 A   12/2008
(Continued)

OTHER PUBLICATIONS

Extended European Search Report issued Mar. 15, 2013 in Patent Application No. 10764442.9.
(Continued)

*Primary Examiner* — Ana Fortuna
(74) *Attorney, Agent, or Firm* — Oblon, McClelland, Maier & Neustadt, L.L.P.

(57) ABSTRACT

There is provided an ion-exchange membrane comprising an ion-exchange layer made of a cationic polymer and/or an anionic polymer and a supporting layer, wherein the ion-exchange layer is formed on the supporting layer by printing. Such an ion-exchange membrane exhibits excellent anti-organic fouling and low membrane resistance, thereby high efficient and long-time stable electrodialysis can be achieved. Formation of the ion-exchange layer as a charge-mosaic layer consisting of the cationic polymer domains and the anionic polymer domains provides a charge-mosaic membrane exhibiting excellent electrolyte permselectivity and mechanical strength.

13 Claims, 2 Drawing Sheets

(51) Int. Cl.
*B01D 29/46* (2006.01)
*C08J 5/20* (2006.01)
*B01J 49/00* (2006.01)
*B01D 69/10* (2006.01)
*B01D 61/44* (2006.01)
*B01D 67/00* (2006.01)
*C08J 5/22* (2006.01)

(56) References Cited

U.S. PATENT DOCUMENTS

| | | | | |
|---|---|---|---|---|
| 4,262,041 | A * | 4/1981 | Eguchi et al. | 427/245 |
| 4,753,725 | A * | 6/1988 | Linder et al. | 210/654 |
| 4,911,844 | A | 3/1990 | Linder et al. | |
| 5,304,307 | A * | 4/1994 | Linder et al. | 210/490 |
| 5,672,438 | A * | 9/1997 | Banerjee et al. | 429/494 |
| 6,235,218 | B1 * | 5/2001 | Annen et al. | 252/186.39 |
| 8,231,013 | B2 * | 7/2012 | Chu et al. | 210/500.1 |
| 2003/0024816 | A1 | 2/2003 | Aritomi et al. | |
| 2003/0192828 | A1 | 10/2003 | Fukutomi et al. | |
| 2004/0126666 | A1 * | 7/2004 | Cao et al. | 429/313 |
| 2005/0214611 | A1 * | 9/2005 | Hommura | 429/30 |
| 2007/0031716 | A1 * | 2/2007 | Rajendran | 429/33 |
| 2007/0051684 | A1 * | 3/2007 | Grebenyuk et al. | 210/681 |
| 2010/0098997 | A1 * | 4/2010 | Ohgi | C08J 5/2231 429/492 |
| 2012/0034481 | A1 * | 2/2012 | Higa et al. | 428/515 |
| 2012/0285881 | A1 * | 11/2012 | Jikihara | B01D 69/02 210/490 |
| 2013/0292252 | A1 * | 11/2013 | Linder et al. | 204/630 |

FOREIGN PATENT DOCUMENTS

| | | |
|---|---|---|
| CN | 101350414 A | 1/2009 |
| EP | 0 047 953 A2 | 3/1982 |
| EP | 2 110 875 A1 | 10/2009 |
| JP | 48 57893 | 8/1973 |
| JP | 59 203613 | 11/1984 |
| JP | 61 146301 | 7/1986 |
| JP | 03 231933 | 10/1991 |
| JP | 08 155281 | 6/1996 |
| JP | 08 276122 | 10/1996 |
| JP | 10-87855 A | 4/1998 |
| JP | 11-239720 A | 9/1999 |
| JP | 2001-49009 A | 2/2001 |
| JP | 2001 157823 | 6/2001 |
| JP | 2003 82130 | 3/2003 |
| JP | 2004 224862 | 8/2004 |
| JP | 2006 297338 | 11/2006 |
| JP | 2007 014958 | 1/2007 |
| JP | 2008 036563 | 2/2008 |
| WO | WO 2004/011535 A1 | 2/2004 |
| WO | WO 2008/090774 A1 | 7/2008 |

OTHER PUBLICATIONS

Hong-Joo Lee et al., "Fouling of an Anion Exchange Membrane in the Electrodialysis Desalination Process in the Presence of Organic Foulants", Desalination, Elsevier, vol. 238, No. 1-3, XP-025884092, Mar. 1, 2009, pp. 60-69.

Junsheng Liu et al., "Membrane Potentials Across Hybrid Charged Mosaic Membrane in Organic Solutions", Chinese Journal of Chemical Engineering, vol. 14, No. 3, XP-022856437, Jun. 1, 2006, pp. 330-336.

K. Ikeda et al., "New Composite Charged Reverse Osmosis Membrane", Desalination, Elsevier, vol. 68, No. 2/03, XP-000083585, Mar. 1, 1988, pp. 109-119.

Higa, M., et al., "Charge mosiac membranes prepared from laminated structures of PVA-based charged layers, 1. Preparation and transport properties of charged mosiac membranes," Journal of Membrane Science, vol. 310, pp. 466-473, (2008).

Kobayashi, E., et al., "Salt permselectivity in charge mosiac membranes and amphoteric membranes," The Proceedings of the Annual Meeting of the Society of Fiber Science and Technology, Japan, vol. 56, No. 1, p. 33, (2001).

Ishizu, K., et al., "Transport of electrolytes through charge mosaic composite membranes," Journal of Membrane Science, vol. 65, pp. 129-140, (1992).

International Search Report Issued Jun. 15, 2010 in PCT/JP10/056566 Filed Apr. 13, 2010.

U.S. Appl. No. 13/259,981, filed Sep. 23, 2011, Jikihara, et al.

U.S. Appl. No. 13/263,260, filed Oct. 6, 2011, Higa, et al.

Search Report issued Aug. 2, 2013 in Chinese Application No. 201080027426.6 (With English Translation).

Office Action issued Nov. 26, 2013, in Japanese Patent Application No. 2011-509294 with English translation.

Office Action and Search Report issued on Dec. 10, 2014 in the corresponding Chinese Patent Application No. 201080027426.6 (with English Translation).

Wang Zhenkun, "Ion Exchange Membrane-Manufacture, Performance and Application", first edition, Chemical Industry Press, Nov. 30, 1986, pp. 61-65 (with English Translation).

Ding Zhonghao, "Comprehensive Utilization Technology of Waste Water recycling", first edition, Hot-spot environmental technology series, Jan. 31, 2007, 7 Pages (with English Translation).

* cited by examiner

ION-EXCHANGE MEMBRANE AND METHOD FOR PRODUCING SAME

This application is a National Stage of PCT/JP10/056566 filed Apr. 13, 2010 and claims the benefit of JP 2009 -097076 filed Apr. 13, 2009 and JP 2009-097077 filed Apr. 13, 2009.

TECHNICAL FIELD

The present invention relates to an ion-exchange membrane and a producing method therefor.

BACKGROUND ART

Ion-exchange membranes are used in electrodialysis and diffusion dialysis for a wide variety of applications such as concentration of seawater, desalination and removal of nitrate-nitrogen from underground brine for providing drinking water, desalination in a process for producing foods and concentration of active ingredients for a medicinal drug. Styrene-divinylbenzene based homogeneous ion-exchange membranes are typically useful in these applications. And owing to development of various technologies such as selectivity between monovalent and divalent ions, improvement in selectivity for a particular ion and lowering membrane resistance, the ion-exchange membranes have been improved to a level useful for industrial separation.

Generally, salts are often formed as by-products in a process for producing an organic compound in a field such as foods, medicinal drugs and agrochemicals as described above. Desalination of a raw liquid to be processed by electrodialysis using an ion-exchange membrane for separating salts contained in an organic substance encounters a problem of so-called organic fouling of a membrane where membrane performance is deteriorated due to adhesion of an organic foulant, particularly electrically-charged macromolecules (hereinafter, referred to as "macro-organic ions") in a liquid to be processed.

As an ion-exchange membrane in which organic fouling is inhibited, an ion-exchange membrane preventing penetration of macro-organic ion into the membrane at its surface, and an ion-exchange membrane having high permeability of macro-organic ions were proposed. The high permeability of macro-organic ions can be easily achieved by formation of a loose membrane structure.

An ion-exchange membrane preventing penetration of macro-organic ions into a membrane has a thin layer, which is neutral or amphoteric or oppositely charged to an ionic group, on its surface. The more dense structure a membrane has and the higher molecular weight the macro-organic ion has, the more effective such an ion-exchange membrane is. A representative example of the ion-exchange membrane is an anion-exchange membrane wherein the surface of a resin membrane having an anion exchange group is modified with a sulfonic group having an opposite charge for preventing an organic anion from permeating the membrane (Patent Reference 1).

Patent Reference 1 has described a process for manufacturing an anion-exchange membrane, comprising sulfonating a membrane polymer having a functional group suitable for introducing an ionic group to partly introduce a sulfonic group to the functional group and then introducing an anion exchange group to the remaining functional group to convert the film polymer into an anion-exchange membrane, wherein the reaction conditions of sulfonation are selected such that an equivalent rate of a sulfonic group to the whole ionic groups is 0.05 to 20% and a ratio of direct-current resistance to alternating-current resistance in the anion-exchange membrane obtained is a threshold of a resistance ratio or less. It has been also described that an anion-exchange membrane prepared by the process exhibits anti-organic fouling and can maintain a higher current efficiency and a lower electric resistance. It has been further described that an anion-exchange membrane having anti-organic fouling property can be provided by convenient means. It, however, has a problem that an electric resistance of the ion-exchange membrane (membrane resistance) substantially increases due to the oppositely charged layer formed in the surface of the resin film.

Patent Reference 2 has described an ion-exchange membrane wherein a polymer chain having an ionic group samely charged to the above ionic group is bound to the surface of an ion-exchange membrane made of a resin containing an ionic-group. It has been described that such an ion-exchange membrane can have excellent anti-organic fouling property without increase in a membrane resistance and can maintain high performance in electrodialysis of a system involving a macro-organic substance for a long period. However, there remains the need for an ion-exchange membrane exhibiting more improved anti-organic fouling and a lower membrane resistance.

Patent Reference 3 has described an ion-exchange membrane wherein a polyether compound containing a polyalkyleneglycol chain is fixed in the surface and/or inside of the membrane. It is believed that the polyether compound present in the surface or the inside of the ion-exchange membrane prevents macro-organic ions and the like from directly contacting the ionic group, so that adsorption of macro-organic ions and the like by the ion-exchange membrane is minimized and consequently anti-organic fouling property is improved. It has been also described that the polyether compound can substantially inhibit increase in an electric resistance of the ion-exchange membrane owing to hydrophilicity derived from the alkyleneglycol chain. However, there remains the need for an ion-exchange membrane exhibiting more improved anti-organic fouling property and a lower membrane resistance.

Patent Reference 4 has described an ion-exchange membrane wherein voids in a microporous membrane are filled with an ion-exchange resin and in pores present at least in one side of the microporous membrane, the ion-exchange resin is exposed at a level lower than the surface of the microporous membrane. Furthermore, Patent Reference 5 has described an ion-exchange membrane for electrodialysis consisting of a microporous membrane having penetrating pores filled with an ion-exchange resin, wherein in the membrane surface, a pore size is 5 µm or less and the pores occupy 3 to 60% of the whole area, and a thickness of the membrane is 15 to 120 µm. It has been described that such an ion-exchange membrane can exhibit excellent anti-organic fouling without deteriorating basic properties such as membrane resistance and ion selectivity. A process for manufacturing such a membrane, however, has a problem that it requires advanced technology and troublesome manufacturing steps.

A charge-mosaic membrane is an ion-exchange membrane comprised of cation-exchange domains and anion-exchange domains which are alternately aligned in a parallel manner and each of which penetrates the membrane from one side to the other side. This unique charge structure can promote permeation of low-molecular-weight ions in a given solution without requiring an external current. When positive charge domains and negative charge domains are aligned in a mosaic manner, an electric circuit in which salt solution positioned on both sides of the membrane act as resistances is formed because these regions have a mutually opposite potential direction. When cations and anions are supplied to the circuit through the negative and the positive charge domains like a current applied to it, respectively, a circulating current is generated, so that salt transport is promoted. It means that a charge-mosaic membrane itself has an inherent mechanism for causing ion transport in contrast to an ion-exchange membrane with a single fixed charge which requires an external current.

There have been reported charge-mosaic membranes produced by various processes. Patent Reference 6 has described a method for desalination an organic compound using a charge-mosaic membrane prepared utilizing a microphase separation phenomenon in a block copolymer. However, a method for producing a charge-mosaic membrane utilizing microphase separation phenomenon of a block copolymer requires very troublesome and advanced technique such as modification of a particular site in a block copolymer, and is so costly that a charge-mosaic membrane cannot be easily produced in a large size or at low cost.

Patent Reference 7 has described a process for producing a charge-mosaic membrane, comprising mixing a membrane-forming polymer, a solvent capable of dissolving the membrane-forming polymer, a cation-exchange resin and an anion-exchange resin to prepare a homogeneous polymer dispersion in which the cation-exchange resin and the anion-exchange resin are dispersed in a polymer solution; coating and extending the polymer dispersion to a substrate; drying it to be solidified; removing a solvent from the film thus obtained and washing the membrane. A charge-mosaic membrane prepared by the process exhibits increase in an amount of permeating salts with increase in a pressure as measured in a piezodialysis experiment. However, in this charge-mosaic membrane, a membrane matrix is not chemically bonded to the ion-exchange resin, and thus, in an interface between them, water and/or a neutral solute leak. High salt permselectivity cannot be, therefore, achieved.

Patent Reference 8 has described a process for producing a charge-mosaic membrane consisting of cationic polymer domains and anionic polymer domains wherein in a crosslinked continuous phase formed by an ionic (either cationic or anionic) polymer, a polymer at least having ionicity opposite to the continuous-phase forming polymer is dispersed as crosslinked particles with an average particle size of 0.01 to 10 µm. The process comprises forming a membrane using a dispersion prepared by dispersing, in a solution of an either ionic polymer forming the continuous phase in the membrane, spherical polymer particles with at least ionicity opposite to the continuous-phase forming polymer; then crosslinking at least the continuous phase in the membrane; and then immersing the membrane in water or an aqueous solution. For a membrane prepared by this process, a domain size and a thickness can be easily regulated and as the most advantageous feature, a membrane with a large area can be relatively easily prepared. This manufacturing process has a problem that the necessity of preparing polymer particles with a small average particle size requires advanced technique and a longer period. Furthermore, since the charge-mosaic membrane thus prepared contains a microgel with a high water content, it exhibits quite poor pressure resistance. In particular, it has a structure in which interfacial adhesion between the membrane matrix and the positive/negative microgel is insufficient. Therefore, a charge-mosaic membrane exhibiting higher electrolyte permeability and mechanical strength is inadequate. Therefore, although the membrane can be used as a membrane for diffusion dialysis, it cannot be used as a membrane for piezodialysis or exhibits extremely poor durability.

Non-patent Reference 1 has described a charge-mosaic membrane prepared by a lamination method. In this lamination method, cation-exchange membranes are prepared from polyvinyl alcohol and a polyanion, and anion-exchange membranes are prepared from polyvinyl alcohol and a polycation, respectively, and these are alternately laminated via polyvinyl alcohol as an adhesive to form a laminated charged block. The block is cut by a laboratory cutter perpendicularly to the lamination plane and crosslinked to give a laminated charge-mosaic membrane with a thickness of about 150 µm. It is described that a laminated charge-mosaic membrane thus prepared has a KCl-salt flux ($J_{KCl}$) of $3.0 \times 10^{-9}$ mol·cm$^{-2}$·S$^{-1}$ and an electrolyte permselectivity ($\alpha$) of 2300, which means that the membrane is very permselective. A tensile strength is 5.7 MPa in a direction parallel to a charged layer while being 2.7 MPa in a vertical direction, indicating that the membrane can be used for diffusion dialysis but must be stronger for piezodialysis applications. Furthermore, its salt permeation flux is so small that the membrane cannot provide adequate dialysis performance.

Non-patent Reference 2 has described a charge-mosaic membrane prepared by a polymer blend method using polyvinyl alcohol as a membrane matrix. In the polymer blend method, to an aqueous solution of a modified PVA polyanion containing polyvinyl alcohol and a vinyl compound having an itaconic group as 2 mol % copolymerization composition is added hydrochloric acid to acidify the solution for preventing dissociation of hydrogen ion from a carboxyl moiety in an itaconic group. To the solution are added polyvinyl alcohol and an aqueous solution of polyallylamine hydrochloride to prepare an aqueous solution of blended polymers. This solution is cast on, for example, a glass plate to form a film, which is then chemically crosslinked to provide a charge-mosaic membrane. It is described that a charge-mosaic membrane thus obtained has a KCl-salt flux ($J_{KCl}$) of $1.7 \times 10^{-8}$ mol·cm$^{-2}$·s$^{-1}$ and an electrolyte permselectivity ($\alpha$) of 48, which is relatively higher, but a further higher electrolyte permselectivity ($\alpha$) is required. Furthermore, there is a problem that salt permselectivity is reduced in an acidic solution.

PRIOR ART REFERENCES

Patent References

Patent Reference 1: JP 48-57893 A
Patent Reference 2: JP 2004-224862 A
Patent Reference 3: JP 2003-82130 A
Patent Reference 4: JP 2001-157823 A
Patent Reference 5: JP 2007-14958 A
Patent Reference 6: JP 59-203613 A
Patent Reference 7: JP 2006-297338 A
Patent Reference 8: JP 8-155281 A Non-Patent References Non-patent Reference 1: J. Membr. Sci., Vol. 310, p. 466 (2008)
Non-patent Reference 2: The proceedings of the Annual Meeting of the Society of Fiber Science and Technology, Japan, Vol. 56, No. 1, p. 33 (2001)
Non-patent Reference 3: J. Membr. Sci., Vol. 65, p. 129 (1992)

SUMMARY OF THE INVENTION

Problem to be Solved by the Invention

To solve the above problems, an objective of the present invention is to provide an ion-exchange membrane with excellent anti-organic fouling and low membrane resistance for high efficient and long-time stable electrodialysis. Another objective is to provide a method for producing an ion-exchange membrane whereby such an ion-exchange membrane can be easily produced.

Another objective of the present invention is to provide an ion-exchange membrane as a charge-mosaic membrane comprising cationic polymer domains and anionic polymer domains, which has excellent salt permeation flux and permselectivity for electrolytes and high mechanical strength. Another objective of the present invention is to provide a method for producing an ion-exchange membrane whereby a large-area charge-mosaic membrane can be easily produced at low cost.

Means for Solving the Problems

The above problems can be solved by providing an ion-exchange membrane comprising an ion-exchange layer made of a cationic polymer and/or an anionic polymer and a supporting layer, wherein the ion-exchange layer is formed on the supporting layer by printing. Here, the ion-exchange layer can be made of either a cationic polymer or an anionic polymer, or can be a charge-mosaic layer consisting of domains of the cationic polymer and domains of the anionic polymer.

The cationic polymer and/or the anionic polymer are preferably a polar polymer. The polar polymer preferably contains a polar functional group of 10 meq/g or more. Examples of a polar functional group include hydroxyl group, carboxyl group, sulfonic group, phosphoric group, carboxylate group, sulfonate group, phosphonate group, amino group, imino group, ammonium group, iminium group, sulfonium group and phosphonium group, and two or more of these polar functional groups can be combined. In a preferred embodiment, the cationic polymer is either a polyvinyl alcohol containing a cationic-group or a mixture of a polymer containing a cationic-group and a cationic-group-free polyvinyl alcohol. In a preferred embodiment, the anionic polymer is either a polyvinyl alcohol containing an anionic-group or a mixture of a polymer containing an anionic-group and an anionic-group-free polyvinyl alcohol. Furthermore, it is preferable that the cationic polymer is a block or graft copolymer containing a polymer component formed by polymerization of a cationic monomer and a polyvinyl alcohol component. Furthermore, it is preferable that the anionic polymer is a block or graft copolymer containing a polymer component formed by polymerization of an anionic monomer and a polyvinyl alcohol component. A content of a cationic monomer in the cationic polymer is preferably 0.1 mol % or more, while a content of an anionic monomer in the anionic polymer is 0.1 mol % or more. The ion-exchange layer is preferably crosslinked.

In an ion-exchange membrane of the present invention, the supporting layer is preferably porous. The supporting layer is preferably made of a polyvinyl alcohol fiber assembly. A ratio (A/B) of a thickness of the ion-exchange layer (A) to a thickness of the supporting layer (B) is preferably 0.2 or less.

Furthermore, the above problems can be solved by providing a method for producing an ion-exchange membrane comprising an ion-exchange layer made of a cationic polymer and/or an anionic polymer and a supporting layer, wherein the ion-exchange layer is formed on the supporting layer by printing. Here, the ion-exchange layer can be a charge-mosaic layer consisting of domains of the cationic polymer and domains of the anionic polymer.

In the producing method of the present invention, the ion-exchange layer is preferably formed on the supporting layer by ink-jet printing, screen printing, transfer printing or dispenser printing. It is also preferable that the ion-exchange layer is crosslinked after it is formed on the supporting layer by printing. It is also preferable that the ion-exchange layer is annealed after it is formed on the supporting layer by printing. It is also preferable that the ion-exchange layer is hot-pressed after it is formed on the supporting layer by printing. Here, it is more preferable that the crosslinking is subjected after the annealing or the hot pressing.

EFFECTS OF THE INVENTION

An ion-exchange membrane of the present invention exhibits excellent anti-organic fouling and low membrane resistance, and thereby high-efficient and long-time stable electrodialysis can be achieved. Furthermore, a supporting layer gives improved dimensional stability in a planar direction of the membrane. An ion-exchange membrane of the present invention can be used in diffusion dialysis. According to a method for producing an ion-exchange membrane of the present invention, such an ion-exchange membrane can be easily produced at low cost.

Furthermore, an ion-exchange membrane of the present invention can be used as a charge-mosaic membrane in which the ion-exchange layer forms a charge-mosaic layer consisting of cationic polymer domains and anionic polymer domains. Such a charge-mosaic membrane exhibits a higher salt permeation flux and excellent electrolyte permselectivity. Thus, the membrane can be efficient in separation between an electrolyte and a nonelectrolyte and removing of an electrolyte (desalination).

Furthermore, a charge-mosaic membrane according to the present invention exhibits excellent mechanical strength, so that it can be used not only for diffusion dialysis, but also for piezodialysis. Furthermore, the supporting layer contributes to improvement in dimensional stability in a planar direction. According to a method for producing an ion-exchange membrane of the present invention, a large-area charge-mosaic membrane can be easily produced at low cost.

BEST MODE FOR CARRYING OUT THE INVENTION

Figure 1:
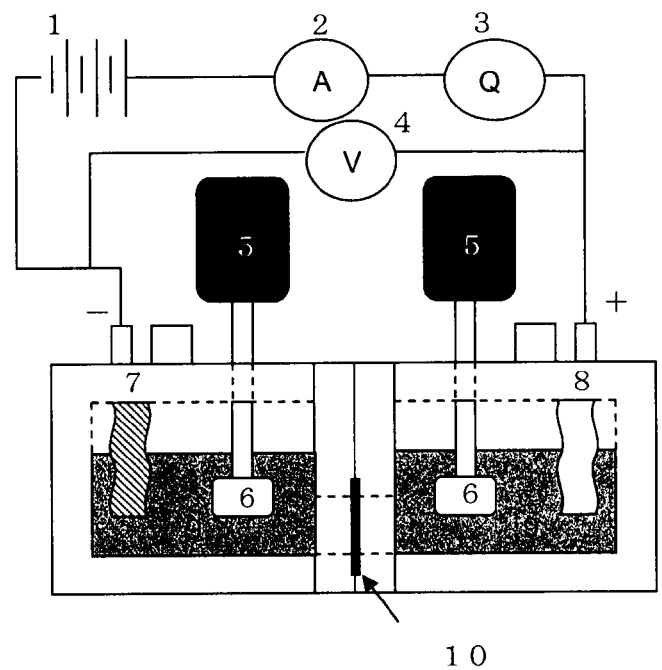
FIG. 1 is a schematic diagram of a dynamic transport number testing device.

An ion-exchange membrane of the present invention contains an ion-exchange layer made of a cationic polymer and/or an anionic polymer and a supporting layer. Containing such an ion-exchange layer and a supporting layer, the ion-exchange membrane can have a lower membrane resistance and exhibit improved mechanical strength. In the present invention, it is essential that an ion-exchange layer is formed on a supporting layer by printing. Thus, a thin ion-exchange layer can be uniformly formed on a supporting layer, resulting in an ion-exchange membrane with a small membrane resistance.

An ion-exchange layer used in the present invention can be made of an ionic polymer selected from a cationic polymer and an anionic polymer. That is, an ion-exchange layer in the present invention can be an anion-exchange layer made of a cationic polymer or a cation-exchange layer made of an anionic polymer.

An ion-exchange layer in the present invention can be a charge-mosaic layer consisting of cationic polymer domains and anionic polymer domains. Forming such a charge-mosaic layer as an ion-exchange layer on a supporting layer allows for providing a charge-mosaic membrane having a larger salt permeation flux and exhibiting improved mechanical strength (hereinafter, sometimes an ion-exchange membrane of the present invention using a charge-mosaic layer consisting of cationic polymer domains and anionic polymer domains as an ion-exchange layer is simply referred to as "charge-mosaic membrane (of the present invention)"). It is essential that the charge-mosaic layer is formed on the supporting layer by printing. Thus, there is provided a membrane in which cationic polymer domains and anionic polymer domains are alternately, adjacently to each other and regularly aligned on a supporting layer and which effectively acts as a charge-mosaic membrane exhibiting improved electrolyte permselectivity.

A cationic polymer used in the present invention is a polymer containing a cationic group in its molecular chain. The cationic group can be contained in any of a main chain, a side chain and a terminals. Examples of a cationic group include ammonium group, iminium group, sulfonium group and phosphonium group. Furthermore, a cationic polymer of the present invention includes a polymer containing a functional group which can be partly converted to ammonium group or iminium group in water, such as amino group and imino group. Among these, ammonium group is preferable in the light of industrial availability. Ammonium group can be any of primary ammonium group (ammonium group), secondary ammonium group (alkyl ammonium group or the like), tertiary ammonium group (dialkyl ammonium group or the like), and quaternary ammonium group (trialkyl ammonium group or the like), and is more preferably quaternary ammonium group (trialkyl ammonium group or the like). The cationic polymer can contain one or multiple types of cationic groups. Examples of a counter anion to the cationic group include, but not limited to, halide ion, hydroxide ion, phosphoric ion and carboxylic ion. Among these, in the light of availability, halide ion is preferable and chloride ion is more preferable. The cationic polymer can contain one or multiple types of counter anions.

A cationic polymer used in the present invention can be a polymer consisting of a structural unit containing a cationic-group or a polymer consisting of both a structural unit containing a cationic-group and a cationic-group-free structural unit. These polymers are preferably crosslinkable. The cationic polymer can be made of one or multiple types of polymers. Alternatively, it can be a mixture of a polymer containing a cationic-group described above and a cationic-group-free polymer.

Examples of a structural unit containing a cationic-group in a cationic polymer include those represented by general formulas (1) to (8).

[chem. 1]

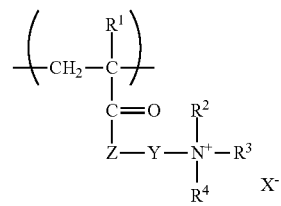

(1)

wherein $R^1$ represents hydrogen or alkyl group having 1 to 4 carbon atoms; $R^2$, $R^3$ and $R^4$, independently of each other, represent hydrogen or optionally substituted alkyl group, aryl group or aralkyl group having 1 to 18 carbon atoms; $R^2$, $R^3$ and $R^4$ can be linked together to form a saturated or unsaturated cyclic structure; Z represents —O—, —NH— or —N(CH$_3$)—; Y represents a divalent linking group having 1 to 8 carbon atoms in total and optionally containing oxygen, nitrogen, sulfur or phosphorous; and $X^-$ represents an anion.

Examples of the counter anion $X^-$ in general formula (1) include halide ion, hydroxide ion, phosphoric ion and carboxylic ion. Examples of a cationic polymer having a structural unit represented by general formula (1) include homopolymers or copolymers of a 3-(meth)acrylamido-alkyltrialkyl ammonium salt such as 3-(meth) acrylamido-propyltrimethylammonium chloride and 3-(meth)acrylamido-3,3-dimethylpropyltrimethylammonium chloride.

[chem. 2]

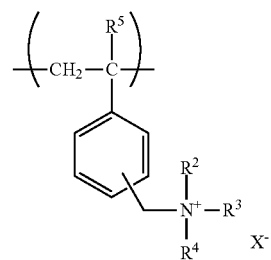

(2)

wherein $R^5$ represents hydrogen or methyl group; and $R^2$, $R^3$, $R^4$ and $X^-$ are as defined in general formula (1).

Examples of a cationic polymer having a structural unit represented by general formula (2) include homopolymers or copolymers of a vinylbenzyltrialkyl ammonium salt such as vinylbenzyltrimethylammonium chloride.

[chem. 3]

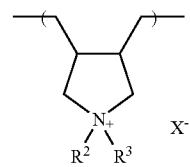

(3)

wherein $R^2$, $R^3$ and $X^-$ are as defined in general formula

[chem. 4]

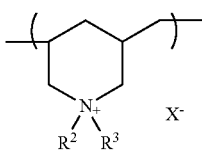

(4)

wherein $R^2$, $R^3$ and $X^-$ are as defined in general formula (1).

Examples of a cationic polymer containing a structural unit represented by general formulas (3) and (4) include homopolymers or copolymers formed by cyclization polymerization of a diallyldialkylammonium salt such as diallyldimethylammonium chloride.

[chem. 5]

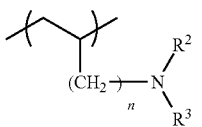

(5)

wherein n represents 0 or 1; and $R^2$ and $R^3$ are as defined in general formula (1).

Examples of a cationic polymer containing a structural unit represented by general formula (5) include homopolymers or copolymers of allylamine.

[chem. 6]

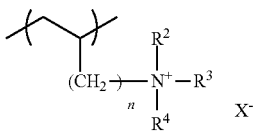

(6)

wherein n represents 0 or 1; and $R^2$, $R^3$, $R^4$ and $X^-$ are as defined in general formula (1).

Examples of a cationic polymer containing a structural unit represented by general formula (6) include homopolymers or copolymers of an allylammonium salt such as allylamine hydrochloride.

[chem. 7]

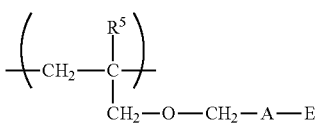

(7)

wherein $R^5$ represents hydrogen or methyl group; A represents —CH(OH)CH$_2$—, —CH$_2$CH(OH)—, —C(CH$_3$)(OH)CH$_2$—, —CH$_2$C(CH$_3$)(OH)—, —CH(OH)CH$_2$CH$_2$— or —CH$_2$CH$_2$CH(OH)—; E represents —N(R$^6$)$_2$ or —N(R$^6$)$_3$·X$^-$; and $R^6$ represents hydrogen or methyl group.

Examples of a cationic polymer containing a structural unit represented by general formula (7) include homopolymers or copolymers of N-(3-allyloxy-2-hydroxypropyl)dimethylamine or its quaternary ammonium salt, or homopolymers or copolymers of N-(4-allyloxy-3-hydroxybutyl)diethylamine or its quaternary ammonium salt.

[chem. 8]

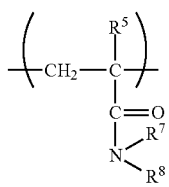

(8)

wherein $R^5$ represents hydrogen or methyl group; $R^7$ represents hydrogen, methyl group, ethyl group, n-propyl group or i-propyl group; and $R^8$ represents hydrogen, methyl group and ethyl group.

Examples of a cationic polymer containing a structural unit represented by general formula (8) include (meth)acrylamide, N-methyl (meth)acrylamide, N-ethyl (meth)acrylamide and N,N-dimethyl (meth) acrylamide.

When the cationic polymer is a copolymer, a compolymerizable component can be suitably a vinyl alcohol component. When it is a mixture of a polymer containing a cationic-group and a cationic-group-free polymer, the cationic-group-free polymer can be suitably selected from those having high affinity for the polymer containing a cationic-group; suitably polyvinyl alcohol and polyacrylamide. Among these, polyvinyl alcohol is more preferable in the light of its higher crosslinkability.

In an ion-exchange membrane of the present invention, the cationic polymer is preferably a polar polymer. Thus, a highly hydrophilic ion-exchange membrane can be provided and such an ion-exchange membrane exhibits excellent anti-organic fouling. Furthermore, when the ion-exchange membrane of the present invention is used as a charge-mosaic membrane, the charge-mosaic membrane also exhibits excellent anti-organic fouling. In addition, since a cationic polymer forming domains in a charge-mosaic layer in a charge-mosaic membrane is a polar polymer, adhesiveness of the domains to anionic polymer domains can be improved, resulting in higher membrane strength.

Among polar polymers, examples of a cationic polymer include a polyvinyl alcohol containing a cationic-group, a cellulose derivative containing a cationic-group, a polyacrylamide containing a cationic-group, a mixture of a polymer containing a cationic-group and a cationic-group-free polyvinyl alcohol, a mixture of a polymer containing a cationic-group and a cationic-group-free cellulose derivative, and a mixture of a polymer containing a cationic-group and a cationic-group-free polyacrylamide. Among these, it is preferably a polyvinyl alcohol containing a cationic-group, or a mixture of a polymer containing a cationic-group and a cationic-group-free polyvinyl alcohol. It is preferable to use a polymer having a vinyl alcohol unit in the light of flexibility of an ion-exchange layer and physical or chemical crosslinkability. When the ion-exchange layer is a charge-mosaic layer, by containing a vinyl alcohol unit as in an anionic polymer described later, the common polyvinyl alcohol unit improves adhesiveness between the cationic polymer domains and the anionic polymer domains, which is preferable in the light of membrane strength. Among these, in the light of availability, particularly preferred is a copolymer of a methacrylamide alkyltrialkylammonium salt and a polyvinyl alcohol component, a copolymer of a vinylbenzyltrialkylammonium salt and a polyvinyl alcohol component, a copolymer of a diallyldialkylammonium salt and a polyvinyl alcohol component, a mixture of a polymer of a methacrylamide alkyltrialkylammonium salt and a polyvinyl alcohol, a mixture of a polymer of a vinylbenzyltrialkylammonium salt and polyvinyl alcohol, or a mixture of a polymer of a diallyldialkylammonium salt and polyvinyl alcohol. In a mixture of a polyvinyl alcohol containing a cationic-group or a mixture of a polymer containing a cationic-group and a cationic-group-free polyvinyl alcohol, a proportion of the number of a vinyl alcohol unit to the total number of monomer units in the cationic polymer is preferably 50 mol % or more, more preferably 70 mol % or more. The cationic polymer can be a single polar polymer or a mixture of multiple types of polar polymers. Alternatively, it can be a mixture of a polar polymer and a non-polar polymer.

In the present invention, a cationic polymer is suitably a block or graft copolymer containing a polymer component formed by polymerization of a cationic monomer and a polyvinyl alcohol component. Thus, the cationic polymer is in the state of microphase separation, so that roles are shared between a polyvinyl alcohol component responsible for improvement in strength, prevention of swelling and shape holding in an ion-exchange membrane and a polymer component formed by polymerizing a cationic monomer which is responsible for anion permeation, and thus both prevention of swelling and dimensional stability in an ion-exchange membrane can be achieved. There are no particular restrictions to a structural unit in a polymer component formed by polymerizing a cationic monomer, and examples include those represented by general formulas (1) to (8) as described above. Among these, in the light of availability, a cationic polymer is preferably a block copolymer containing a polymer component formed by polymerizing a methacrylamide alkyltrialkylammonium salt and a polyvinyl alcohol component, a block copolymer containing a polymer component formed by polymerizing a vinylbenzyltrialkylammonium salt and a polyvinyl alcohol component, or a block copolymer containing a polymer component formed by polymerizing a diallyldialkylammonium salt and a polyvinyl alcohol component.

There are no particular restrictions to a content of a cationic monomer in a cationic polymer, but a content of a cationic monomer in a cationic polymer, that is, a proportion of the number of a cationic monomer unit to the total number of monomer units in a cationic polymer is preferably 0.1 mol % or more. If a content of a cationic monomer is less than 0.1 mol %, an effective charge density in an ion-exchange layer may be reduced, leading to deterioration in counter-ion selectivity of the membrane. Furthermore, when the ion-exchange layer is a charge-mosaic layer, electrolyte permselectivity may be deteriorated. The content is more preferably 0.5 mol % or more, further preferably 1 mol % or more. A cationic monomer content is preferably 50 mol % or less. If the content is more than 50 mol %, an ion-exchange membrane becomes so swellable that mechanical strength may be deteriorated. In addition, counter-ion selectivity may be deteriorated. When the ion-exchange layer is a charge-mosaic layer, salt permselectivity may be deteriorated. The content is more preferably 30 mol % or less, further preferably 20 mol % or less. When a cationic polymer is a mixture of a polymer containing a cationic-group and a cationic-group-free polymer or a mixture of multiple types of polymers containing a cationic-group, a content of a cationic monomer is a proportion of the number of the cationic monomer unit to the total number of monomer units in the mixture.

An anionic polymer used in the present invention is a polymer containing an anionic group in its molecular chain. The anionic group can be contained in any of a main chain, a side chain and a terminus. Examples of an anionic group include sulfonate group, carboxylate group and phosphonate group. Furthermore, an anionic polymer of the present invention includes a polymer containing a functional group which can be partly converted to sulfonate group, carboxylate group or phosphonate group in water, such as sulfonic group, carboxyl group and phosphonic acid group. Among these, in the light of a large ion dissociation constant, sulfonate group is preferable. The anionic polymer can contain one anionic group or multiple types of anionic groups. Examples of a counter cation to the anionic group include, but not limited to, proton and alkali metal ions. Among these, an alkali metal ion is preferable in the light of minimization of the problem of corrosion in a facility. The anionic polymer can contain one type of counter cation or multiple types of counter cations.

The anionic polymer can be a polymer consisting of a structural unit containing an anionic-group used in the present invention or a polymer consisting of both a structural unit containing an anionic-group and an anionic-group-free structural unit. These polymers are preferably crosslinkable. The anionic polymer can consist of one type of polymer or contain multiple types of polymers. It can be a mixture of the polymer containing an anionic-group and the anionic-group-free polymer.

Examples of a structural unit containing an anionic-group in an anionic polymer include those represented by general formulas (9) and (10).

[chem. 9]

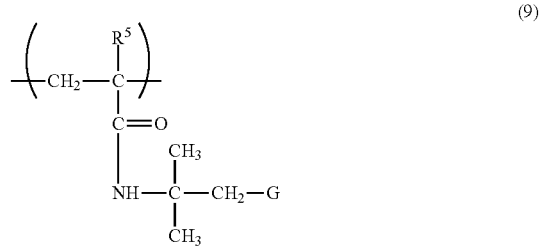

(9)

wherein $R^5$ represents hydrogen or methyl group; G represents —SO$_3$H, —SO$_3^-$M$^+$, —PO$_3$H, —PO$_3^-$M$^+$, —CO$_2$H or —CO$_2^-$M$^+$; M$^+$ is ammonium ion or alkali metal ion.

Examples of an anionic polymer containing a structural unit represented by general formula (9) include homopolymers or copolymers of 2-acrylamido-2-methylpropanesulfonic acid.

[chem. 10]

(10)

wherein $R^5$ represents hydrogen or methyl group; T represents phenylene group or naphthylene group optionally substituted with methyl group; and G is as defined for general formula (9).

Examples of an anionic polymer containing a structural unit represented by general formula (10) include homopolymers or copolymers of a p-styrenesulfonate such as sodium p-styrenesulfonate.

Furthermore, examples of an anionic polymer can include homopolymers or copolymers of a monomer containing a sulfonic group or its salt such as vinylsulfonic acid and (meth)acrylsulfonic acid, or homopolymers or copolymers of a monomer containing a carboxyl group such as fumaric acid, maleic acid, itaconic acid, maleic anhydride and itaconic anhydride, its derivative or its salt.

In general formula (9) or (10), G is preferably sulfonate group, sulfonic group, phosphonate group or phosphonic group, which gives a higher charge density. An alkali metal ion represented by $M^+$ in general formulas (9) and (10) include sodium, potassium and lithium ions.

When an anionic polymer is a copolymer, a copolymerizable component is suitably a vinyl alcohol component. When a mixture of a polymer containing an anionic-group and an anionic-group-free polymer are used, the anionic-group-free polymer is suitably selected from those having high affinity for the polymer containing an anionic-group; suitably polyvinyl alcohol and polyacrylamide. Among these, polyvinyl alcohol is more preferable in the light of its higher crosslinkability.

In an ion-exchange membrane of the present invention, the anionic polymer is preferably a polar polymer. Thus, a highly hydrophilic ion-exchange membrane can be provided and such an ion-exchange membrane exhibits excellent anti-organic fouling. Furthermore, when the ion-exchange membrane of the present invention is used as a charge-mosaic membrane, the charge-mosaic membrane also exhibits excellent anti-organic fouling. In addition, since an anionic polymer forming domains in a charge-mosaic layer in a charge-mosaic membrane is a polar polymer, adhesiveness of the domains to cationic polymer domains can be improved, resulting in higher membrane strength.

Among polar polymers, examples of an anionic polymer include a polyvinyl alcohol containing an anionic-group, a cellulose derivative containing an anionic-group, a polyacrylamide containing an anionic-group, a mixture of a polymer containing an anionic-group and an anionic-group-free polyvinyl alcohol, a mixture of a polymer containing an anionic-group and an anionic-group-free cellulose derivative, and a mixture of a polymer containing an anionic-group and an anionic-group-free polyacrylamide. Among these, it is preferably a polyvinyl alcohol containing an anionic-group or a mixture of a polymer containing an anionic-group and an anionic-group-free polyvinyl alcohol. It is preferable to use a polymer having a vinyl alcohol unit in the light of flexibility of an ion-exchange layer in an ion-exchange membrane and physical or chemical crosslinkability. When the ion-exchange layer is a charge-mosaic layer, by containing a vinyl alcohol unit as in a cationic polymer, the common polyvinyl alcohol unit improves adhesiveness between the cationic polymer domains and the anionic polymer domains, which is preferable in the light of membrane strength. Among these, in the light of availability, particularly preferred is a copolymer of 2-acrylamido-2-methylpropanesulfonate and a polyvinyl alcohol component, a copolymer of a p-styrenesulfonate and a polyvinyl alcohol component, a mixture of 2-acrylamido-2-methylpropanesulfonate polymer and a polyvinyl alcohol, or a mixture of a p-styrenesulfonate polymer and a polyvinyl alcohol. In a polyvinyl alcohol containing an anionic-group or a mixture of a polymer containing an anionic-group and an anionic-group-free polyvinyl alcohol, a proportion of the number of a vinyl alcohol unit to the total number of monomer units in the anionic polymer is preferably 50 mol % or more, more preferably 70 mol % or more. The anionic polymer can be a single polar polymer or a mixture of multiple types of polar polymers. Alternatively, it can be a mixture of a polar polymer and a non-polar polymer.

In the present invention, an anionic polymer is suitably a block or graft copolymer containing a polymer component formed by polymerization of an anionic monomer and a polyvinyl alcohol component. Thus, the anionic polymer is in the state of microphase separation, so that roles are shared between a polyvinyl alcohol component responsible for improvement in strength of the whole ion-exchange membrane, prevention of swelling of the membrane and shape holding and a polymer component formed by polymerizing an anionic monomer which is responsible for cation permeation, and thus both prevention of swelling and dimensional stability in an ion-exchange membrane can be achieved. There are no particular restrictions to a structural unit in a polymer component formed by polymerizing an anionic monomer, and examples include those represented by general formulas (9) and (10) as described above. Among these, in the light of availability, an anionic polymer is preferably a block copolymer containing a polymer component formed by polymerizing a p-styrenesulfonate and a polyvinyl alcohol component, or a block copolymer containing a polymer component formed by polymerizing a 2-acrylamido-2-methylpropanesulfonate and a polyvinyl alcohol component.

There are no particular restrictions to a content of an anionic monomer in an anionic polymer, but a content of an anionic monomer in an anionic polymer, that is, a proportion of the number of an anionic monomer unit to the total number of monomer units in an anionic polymer is preferably 0.1 mol % or more. If a content of an anionic monomer is less than 0.1 mol %, an effective charge density in an ion-exchange layer may be reduced, leading to deterioration in counter-ion selectivity of the membrane. Furthermore, when the ion-exchange layer is a charge-mosaic layer, electrolyte permselectivity may be deteriorated. The content is more preferably 0.5 mol % or more, further preferably 1 mol % or more. An anionic monomer content is preferably 50 mol % or less. If the content is more than 50 mol %, an ion-exchange membrane becomes so swellable that mechanical strength may be deteriorated. In addition, counter-ion selectivity may be deteriorated. When the ion-exchange layer is a charge-mosaic layer, salt permselectivity may be deteriorated. The content is more preferably 30 mol % or less, further preferably 20 mol % or less. When an anionic polymer is a mixture of a polymer containing an anionic-group and an anionic-group-free polymer or a mixture of multiple types of polymers containing an anionic-group, a content of an anionic monomer is a proportion of the number of the anionic monomer unit to the total number of monomer units in the mixture.

When an ion-exchange membrane of the present invention is used as a charge-mosaic membrane as described above, it is preferable that both cationic polymer and anionic polymer are polar polymers. When both cationic polymer and anionic polymer are polar polymers, a highly hydrophilic charge-mosaic membrane can be provided, resulting in effectively minimizing the problem of so-called organic fouling of a membrane, that is, adhesion of organic fouling substances in a liquid to be processed to a charge-mosaic membrane which leads to deterioration in membrane performance. Furthermore, adhesiveness between cationic polymer domains and anionic polymer domains is improved, so that a charge-mosaic membrane with high membrane strength can be provided.

In a cationic or anionic polymer in a charge-mosaic membrane, structural units except a cationic or anionic group can be independently of each other selected, but it is preferable that the cationic polymer and the anionic polymer have an identical structural unit. Thus, affinity between domains is improved, so that a charge-mosaic layer has higher mechanical strength. Both cationic and anionic polymers have an identical structural unit preferably in 50 mol % or more, more preferably 80 mol % or more.

The identical structural unit is particularly preferably a vinyl alcohol unit because its water solubility is suitable for printing. When both cationic and anionic polymers have a vinyl alcohol unit, domains after printing can be chemically crosslinked via a crosslinking agent such as glutaraldehyde, so that mechanical strength of a charge-mosaic membrane can be further improved.

In a specific example in which the identical structural unit is a vinyl alcohol unit, cationic polymer domains are made of a polyvinyl alcohol containing a cationic-group or a mixture of a polymer containing a cationic-group and a cationic-group-free polyvinyl alcohol and anionic polymer domains are made of a polyvinyl alcohol containing an anionic-group or a mixture of a polymer containing an anionic-group and a cationic-group-free polyvinyl alcohol.

It is also preferable that a cationic polymer is a block copolymer or graft copolymer containing a polymer component formed by polymerizing a cationic monomer and a polyvinyl alcohol component and an anionic polymer is a block copolymer or graft copolymer containing a polymer component formed by polymerizing an anionic monomer and a polyvinyl alcohol component.

A polyvinyl alcohol containing a cationic-group or an anionic-group used in an ion-exchange membrane of the present invention is produced by copolymerizing a cationic or anionic monomer with a vinyl ester monomer and saponifying the resulting copolymer as usual. The vinyl ester monomer can be any radically copolymerizable monomer. Examples include vinyl formate, vinyl acetate, vinyl propionate, vinyl valerate, vinyl caprate, vinyl laurate, vinyl stearate, vinyl benzoate, vinyl pivalate and vinyl versatate. Among these, vinyl acetate is preferable.

A cationic or anionic monomer can be copolymerized with a vinyl ester monomer by a known method such as bulk polymerization, solution polymerization, suspension polymerization and emulsion polymerization. Among these, bulk polymerization in a nonsolvent system and solution polymerization using a solvent such as an alcohol are generally employed. An alcohol used as a solvent in a copolymerization reaction employing solution polymerization can be a lower alcohol such as methanol, ethanol and propanol. Examples of an initiator used in the copolymerization reaction include known initiators including an azo initiator such as 2,2'-azobisisobutyronitrile (AIBN), 2,2'-azobis(2,4-dimethyl-valeronitrile), 1,1'-azobis(cyclohexane-1-carbonitrile) and 2,2'-azobis(N-butyl-2-methylpropionamide); and a peroxide initiator such as benzoyl peroxide and n-propyl peroxycarbonate. A polymerization temperature during the copolymerization reaction is suitably, but not limited to, 5 to 180° C.

A vinyl ester polymer prepared by copolymerizing a cationic or anionic monomer with a vinyl ester monomer can be saponified in a solvent by a known method to give polyvinyl alcohol containing a cationic-group or an anionic-group.

A catalyst for a saponification reaction of a vinyl ester polymer is generally an alkaline substance such as alkali metal hydroxides such as potassium hydroxide and hydroxide sodium; and alkali metal alkoxides such as sodium methoxide. The saponification catalyst can be added in one portion at the initiation of the saponification reaction or it can be added in part at the initiation of the saponification reaction and the remaining is added in the course of the saponification reaction. Examples of a solvent used in the saponification reaction include methanol, methyl acetate, dimethylsulfoxide, diethylsulfoxide and dimethylformamide. Among these, methanol is preferable. The saponification reaction can be conducted either in batch style or in a continuous process. At the end of the saponification reaction, the remaining saponification catalyst can be, if necessary, neutralized and examples of a neutralizing agent include organic acids such as acetic acid and lactic acid and ester compounds such as methyl acetate.

A saponification degree of a polyvinyl alcohol containing a cationic-group or an anionic-group is preferably, but not limited to, 40 to 99.9 mol %. If a saponification degree is less than 40 mol %, crystallinity may be deteriorated and an ion-exchange layer has inadequate strength. A saponification degree is more preferably 60 mol % or more, further preferably 80 mol % or more. A saponification degree is generally 99.9 mol % or less. Here, when the polyvinyl alcohol is a mixture of multiple types of polyvinyl alcohols, a saponification degree is an average saponification degree of the whole mixture. A saponification degree of a polyvinyl alcohol is determined in accordance with JIS K6726. A saponification degree of a cationic-group- or anionic-group-free polyvinyl alcohol used in the present invention is also preferably within the above range.

A viscosity-average polymerization degree of a polyvinyl alcohol containing a cationic-group or an anionic-group (hereinafter, sometimes simply referred to as "polymerization degree") is preferably, but not limited to, 50 to 10000. If a polymerization degree is less than 50, an ion-exchange layer may have inadequate strength in practical use. A polymerization degree is more preferably 100 or more. If a polymerization degree is more than 10000, a viscosity of a polymerization solution used in printing may become too high to be handled. A polymerization degree is preferably 8000 or less. Here, when the polyvinyl alcohol is a mixture of multiple types of polyvinyl alcohols, a polymerization degree is an average polymerization degree of the whole mixture. A viscosity-average polymerization degree of a polyvinyl alcohol is determined in accordance with JIS K6726. A polymerization degree of a cationic-group- or anionic-group-free polyvinyl alcohol used in the present invention is also preferably within the above range.

A block copolymer containing a polymer component formed by polymerizing a cationic or anionic monomer and a polyvinyl alcohol component used in the present invention can be manufactured by any of the following two general methods, that is, (1) a desired block copolymer is produced and then a cationic or anionic group is attached to a particular block, and (2) at least one cationic or anionic monomer is polymerized to produce a desired block copolymer. Among these, in the light of industrial convenience, for (1), it is preferable that in the presence of a polyvinyl alcohol containing a terminal mercapto group, one or more monomers are block-copolymerized and then a cationic or anionic group is introduced into one or multiple polymer components in the block copolymer. And for (2), it is preferable that in the presence of a polyvinyl alcohol containing a terminal mercapto group, at least one cationic or anionic monomer is radically polymerized to produce a block copolymer. In particular, since the types and the amounts of a polyvinyl alcohol component and a polymer component formed by polymerizing a cationic or anionic monomer in a block copolymer can be easily controlled, a block copolymer is preferably produced by radically polymerizing at least one cationic or anionic monomer in the presence of a polyvinyl alcohol containing a terminal mercapto group.

A vinyl alcohol polymer containing a terminal mercapto group used in the production of a block copolymer described above can be prepared, for example, as described in JP 59-187003 A. That is, it can be, for example, prepared by saponifying a vinyl ester polymer formed by radically polymerizing a vinyl ester monomer such as vinyl acetate in the presence of a thiol acid. A process for producing a block copolymer using a polyvinyl alcohol containing a terminal mercapto group thus obtained and a cationic or anionic monomer is described, for example, in JP 59-189113 A. That is, a block copolymer can be produced by radically polymerizing a cationic or anionic monomer in the presence of a polyvinyl alcohol containing a terminal mercapto group. This radical polymerization can be conducted by any known method such as bulk polymerization, solution polymerization, pearl polymerization and emulsion polymerization, and preferably conducted in a solvent which can dissolve the polyvinyl alcohol containing a terminal mercapto group, such as a water or dimethyl sulfoxide based medium. The polymerization process can be any of batch, semi-batch and continuous types.

An ion-exchange membrane of the present invention can contain a variety of additives such as an inorganic filler as long as they do not make the present invention ineffective.

A charge density of an ion-exchange membrane of the present invention is preferably, but not limited to, 0.1 to 20 $mol·dm^{-3}$. If a charge density is less than 0.1 $mol·dm^{-3}$, counter-ion selectivity of a membrane may be deteriorated. A charge density is more preferably 0.3 $mol·dm^{-3}$ or more, further preferably 0.5 $mol·dm^{-3}$ or more. If a charge density of a membrane is more than 20 $mol·dm^{-3}$, a membrane is so swollen that its dimensional stability and handling properties may be deteriorated. A charge density of a membrane is more preferably 10 $mol·dm^{-3}$ or less, further preferably 3 $mol·dm^{-3}$ or less.

There are no particular restrictions to a supporting layer used in an ion-exchange membrane of the present invention as long as an ion-exchange layer can be formed on it, but it is preferably porous. Because of its porosity, a supporting layer promotes ion permeation and salt transport. Examples of a porous supporting layer include nonwoven fabrics, membranes, textile fabrics and synthetic papers, and any known porous sheet can be used. Among these supports, particularly preferred are nonwoven fabrics, membranes and synthetic papers. A material of a supporting layer is preferably a polyvinyl alcohol fiber assembly.

A thickness (B) of a supporting layer is preferably, but not limited to, 5 to 1000 μm. If a thickness (B) of a supporting layer is less than 5 μm, an ion-exchange membrane may have inadequate strength. The thickness is more preferably 10 μm or more. If a thickness (B) of a supporting layer is more than 1000 μm, ions or salts may be poorly transported. The thickness is more preferably 800 μm or less, further preferably 300 μm or less.

A thickness (A) of an ion-exchange layer is preferably, but not limited to, 0.1 to 80 μm in the light of lowering a membrane resistance and increase in an ion or salt permeation flux. If a thickness (A) of an ion-exchange layer is less than 0.1 μm, membrane defect (pinhole) may occur in the course of producing an ion-exchange layer. And mechanical strength of an ion-exchange layer may be deteriorated. The thickness is more preferably 0.5 μm or more, further preferably 1 μm or more, particularly preferably 2 μm or more. If a thickness (A) of ion-exchange layer is more than 80 μm, a salt permeation flux may be reduced. The thickness is more preferably 50 μm or less, further preferably 20 μm or less, particularly preferably 10 μm or less.

A ratio (A/B) of a thickness (A) of ion-exchange layer to a thickness (B) of a supporting layer in an ion-exchange membrane of the present invention is preferably, but not limited to, 0.001 to 0.2. If the ratio (A/B) is less than 0.001, a resulting ion-exchange layer may have defects. The ratio is more preferably 0.005 or more, further preferably 0.01 or more. If the ratio (A/B) is more than 0.2, a membrane resistance may be excessively large. When an ion-exchange membrane of the present invention is a charge-mosaic membrane, a salt permeation flux may be excessively reduced. The ratio is more preferably 0.15 or less, further preferably 0.1 or less.

When an ion-exchange membrane of the present invention is a charge-mosaic membrane, a domain size (Wc) of domains in a cationic polymer constituting the charge-mosaic layer is preferably, but not limited to, 1000 μm or less because there is a tendency that the smaller a distance between a positive charge region and a negative charge region in the charge-mosaic membrane is, the higher electrolyte permselectivity. The domain size is more preferably 500 μm or less, further preferably 300 μm or less, particularly preferably 100 μm or less. A domain size of cationic polymer domains means an average diameter of inscribed circles to the domains, and is determined as an arithmetic average from domain dimensions microscopically observed in a horizontal direction.

A domain size (Wa) of domains in an anionic polymer constituting a charge-mosaic layer in a charge-mosaic membrane of the present invention is preferably, but not limited to, 1000 μm or less because a distance between a positive charge region and a negative charge region in the charge-mosaic membrane is reduced and electrolyte permselectivity becomes higher. The domain size is more preferably 500 μm or less, further preferably 300 μm or less, particularly preferably 100 μm or less. A domain size of anionic polymer domains means an average diameter of inscribed circles to the domains, and is determined as an arithmetic average from domain dimensions microscopically observed in a horizontal direction.

An ion-exchange membrane of the present invention is produced by forming the above ion-exchange layer on a support by printing. That is, an anion- or cation-exchange membrane as an ion-exchange membrane of the present invention can be produced by forming an ion-exchange layer made of an ionic polymer selected from a cationic polymer and an anionic polymer on a supporting layer by printing.

An ion-exchange layer can be formed in a desired pattern on a supporting layer by printing the ion-exchange layer on the supporting layer using a solution containing a cationic or anionic polymer. By such a method, thin ion-exchange layer can be formed on a supporting layer and thus an ion-exchange membrane with a low membrane resistance can be produced. An ion-exchange membrane can be produced by a convenient method. Here, a pattern formed can be uniform over the whole surface. Printing is generally conducted using a printer.

Furthermore, a charge-mosaic membrane of the present invention can be produced by forming a charge-mosaic layer consisting of cationic polymer domains and anionic polymer domains as an ion-exchange layer on a supporting layer by printing.

A charge-mosaic layer can be conveniently formed in a desired pattern on a supporting layer by applying a solution containing a cationic polymer and a solution containing an anionic polymer on the supporting layer by printing. Furthermore, a thin charge-mosaic layer can be formed on a supporting layer and thus a charge-mosaic membrane with a large permeation flux can be produced. Furthermore, a domain size of each of domains made of a cationic and an anionic polymer can be reduced to provide a charge-mosaic membrane exhibiting excellent electrolyte permselectivity. The above pattern can have a shape such as, but not limited to, stripe, check, lattice and polka dot patterns. Printing is generally conducted using a printer.

A printing procedure used in the present invention can be any of known printing procedures. Specific examples of a printing procedure include ink-jet printing, screen printing, transfer printing, dispenser printing, gravure printing and offset printing. Among these, ink-jet printing, screen printing, transfer printing and dispenser printing are particularly preferable in the light of easiness in printing.

It is desirable that in a process for producing an ion-exchange membrane of the present invention, an ion-exchange layer formed is annealed. Annealing causes crystallinity degree to be higher, increases physical crosslinking sites and increases mechanical strength of an ion-exchange membrane obtained. Furthermore, cationic or anionic groups are concentrated in amorphous regions to promote formation of ion-exchange paths, resulting in increase in a charge density and improvement in counter-ion selectivity. Annealing is generally, but not limited to, conducted using a hot-air dryer. A annealing temperature is preferably, but not limited to, 50 to 250 for polyvinyl alcohol. If a annealing temperature is lower than 50° C., an ion-exchange membrane obtained may have insufficient mechanical strength. The temperature is more preferably 80° C. or higher, further preferably 100° C. or higher. If a annealing temperature is higher than 250° C., polyvinyl alcohol may melt. The temperature is more preferably 230° C. or lower, further preferably 200° C. or lower. A annealing period is generally about 1 min to 10 hours. Annealing is desirably conducted under an inert gas (for example, nitrogen gas and argon gas) atmosphere.

In a process for producing an ion-exchange membrane of the present invention, it is preferable that after forming an ion-exchange layer, a product is hot-pressed. Hot pressing makes an ion-exchange layer formed by printing denser, resulting in higher mechanical strength of the ion-exchange layer obtained. Hot pressing can be generally, but not limited to, conducted using a calendering equipment. A temperature of hot pressing is preferably, but not limited to, 80 to 250° C. for polyvinyl alcohol. If a hot-pressing temperature is lower than 80° C., an ion-exchange layer obtained may have insufficient mechanical strength. The temperature is more preferably 100° C. or higher, further preferably 130° C. or higher. If a hot-pressing temperature is higher than 250° C., polyvinyl alcohol may melt. The press temperature is more preferably 230° C. or lower, further preferably 200° C. or lower.

In a process for producing an ion-exchange membrane of the present invention, it is preferable that after forming an ion-exchange layer, it is crosslinked. Crosslinking increases mechanical strength of the resulting ion-exchange layer. Furthermore, a charge density increases, resulting in improvement in counter-ion selectivity. There are no particular restrictions to a crosslinking method as long as it can chemically bind molecular chains in the polymer. The method is generally immersing an ion-exchange layer in a solution containing a crosslinking agent. Examples of the crosslinking agent include glutaraldehyde, formaldehyde and glyoxal. A concentration of the crosslinking agent is generally, as a volume concentration, 0.001 to 1% by volume in the solution.

In the above producing process, all of annealing, hot pressing and crosslinking can be conducted, or alternatively two or one of these can be conducted. There are no particular restrictions to the order of these processes. Multiple processes can be conducted simultaneously. Preferably, crosslinking is conducted after annealing or hot pressing. It is because annealing or hot pressing causes formation of sites insusceptible to crosslinking and then, after crosslinking, particularly chemical crosslinking, crosslinked and uncrosslinked sites coexist, resulting in improvement in membrane strength. The order of hot pressing, annealing and crosslinking is particularly preferable in the light of mechanical strength of an ion-exchange membrane obtained.

An ion-exchange membrane of the present invention can be used in a variety of applications. For example, an ion-exchange membrane of the present invention containing an ion-exchange layer made of a cationic or anionic polymer exhibits excellent anti-organic fouling and has a lower membrane resistance and allows for efficient and stable electrodialysis for a long period. Such an ion-exchange membrane is, therefore, suitable for desalination of organic materials (foods, raw materials for drugs), desalination of whey, salt concentration, desalination of a sugar solution, desalination of seawater or brine and desalination and softening of tap water. Generally, it is particularly suitably used as an anion-exchange membrane in which organic fouling is significant.

Furthermore, exhibiting a large salt permeation flux and excellent electrolyte permselectivity, a charge-mosaic membrane of the present invention is suitable for water purification, desalination of foods or raw materials for drugs, desalination of brine or seawater and water conversion. Having excellent mechanical strength, a charge-mosaic membrane of the present invention is particularly suitable for piezodialysis. According to a method for producing a charge-mosaic membrane of the present invention, a large-area membrane can be easily produced at low cost.

EXAMPLES

The present invention will be detailed with reference to Examples. In the examples and comparative examples, unless otherwise indicated, "%" and "part(s)" are by weight. Analyses and evaluations in these examples and comparative examples were conducted as described below.

(1) Thickness (A) of an Ion-exchange Layer and Thickness (B) of a Supporting Layer An ion-exchange membrane was immersed in ion-exchanged water at 25° C. for 5 days or more to achieve swelling equilibrium, and a section sample was cut by a surgical knife. Then, for an anion-exchange membrane and a charge-mosaic membrane, the membrane was immersed in a $5 \times 10^{-5}$ mol/L solution of Methyl Violet in ion-exchanged water for 30 min for staining an anion-exchange layer or cationic polymer domains to prepare a measurement sample. For a cation-exchange membrane, the membrane was immersed in a $1 \times 10^{-4}$ mol/L aqueous solution of Acid Blue in ion-exchanged water for 10 min for staining a cation-exchange layer to prepare a measurement sample. The section of the measurement sample thus prepared was observed by a light microscope "OPTIPHOT-2" from Nikon Corporation and the image data obtained were analyzed by "NIS-Elements.D.2.30" from Nikon Corporation to calculate a thickness (A) of the ion-exchange layer. Likewise, a thickness (B) of the supporting layer was calculated.

(2) Dynamic Transport Number

A dynamic transport number of an ion-exchange membrane was measured using a dynamic transport number testing device shown in FIG. 1. The device is equipped with a power source 1, an ampere meter 2, a coulomb meter 3, a voltmeter 4 and a stirrer 6 rotated using a motor 5. An ion-exchange membrane 10 was inserted in a two-chamber cell 9 having two electrode plates to be a cathode electrode (AgCl electrode) 7 and an anode electrode (Ag electrode) 8, and both sides of the ion-exchange membrane were filled with a 0.5 mol/L solution of NaCl. Electrodialysis was conducted with a predetermined current density (J=10 mA·cm$^{-2}$) for a predetermined time (t). An effective membrane area of the ion-exchange membrane 10 in the two-chamber cell 9 used was 8.0 cm$^2$ (2 cm×4 cm). Then, a measured solution was collected and diluted in a 300 mL volumetric flask. A conductivity of the diluted solution was measured by a conductance meter, and a measured conductivity was substituted in the following equation to calculate a dynamic transport number $t_{d+}$.

$$t_{d+} = \Delta m / E_a$$

$t_{d+}$: dynamic transport number
$\Delta m$: transfer equivalent
$E_a$: theoretical equivalent=I×t/F
I: applied current
t: measurement time (current applying time)
F: Faraday constant.

(3) Membrane Resistance

Figure 2:
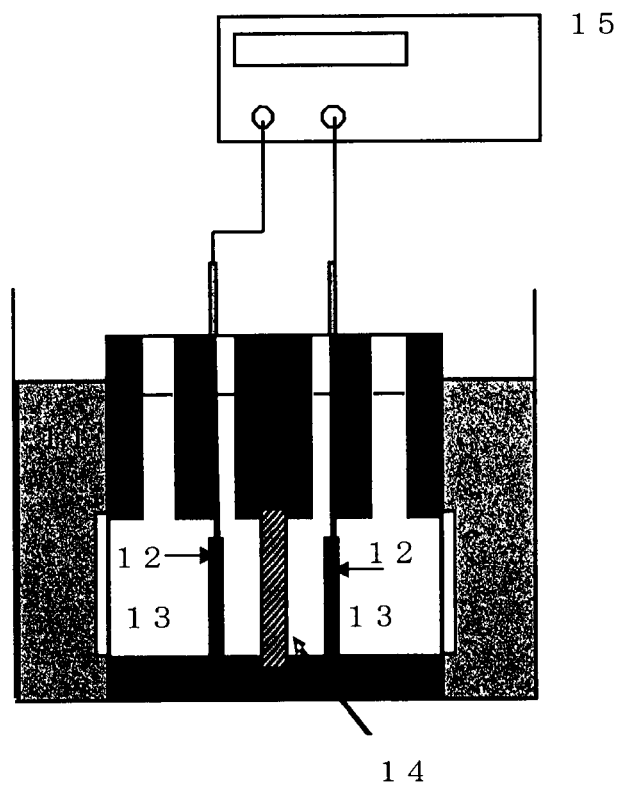
FIG. 2 is a schematic diagram of a membrane resistance testing device.

As a pretreatment, a sample for measurement was preliminarily immersed in a 0.5 mol/L solution of NaCl until equilibrium was established. A membrane resistance was measured using a membrane resistance testing device shown in FIG. 2. An ion-exchange membrane 14 was inserted in two-chamber cell 13 having two platinum black electrode plates to be electrodes 12 placed in a water bath 11, and both sides of the membrane were filled with a 0.5 mol/L solution of NaCl. Connecting an LCR meter 15 to both electrodes, an interelectrode resistance was measured at 25° C. by an AC bridge (frequency: 1000 cycles/s). An effective membrane area of the ion-exchange membrane 14 in the two-chamber cell 13 used was 1.0 cm$^2$. A membrane resistance was determined from a difference between the interelectrode resistance obtained and an interelectrode resistance measured in the absence of an ion-exchange membrane 14.

(4) Anti-organic Fouling Property

For an anion-exchange membrane, a measurement sample was conditioned by immersing it in a 0.1 mol/L solution of NaCl until equilibrium was achieved, and then the ion-exchange membrane was inserted in two-chamber cell having a silver and a silver chloride electrodes. And the anode chamber was filled with a 0.05 mol/L solution of NaCl while the cathode chamber was filled with a mixed solution of 1000 ppm sodium dodecylbenzenesulfonate as an organic fouling substance and 0.05 mol/L NaCl. While the solutions of both chambers were stirred at a rotation rate of 1500 rpm, electrodialysis was conducted at a current density of 0.2 A/dm$^2$. At this time, platinum wires were fixed in the vicinity of both sides of the membrane and an inter-membrane voltage was measured. When organic fouling occurs during current application, an inter-membrane voltage increases. An inter-membrane voltage 30 min after initiating current application was measured and a difference between voltages in the presence of and in the absence of an organic fouling substance ($\Delta E$) was determined and used as a measure of membrane fouling. For a cation-exchange membrane, anti-organic fouling property was determined as described for the above method, substituting a solution containing polyethylene imine having a molecular weight of 2000 at 1000 ppm for sodium dodecylbenzenesulfonate as an organic fouling substance.

(5) Diffusion Dialysis Test

Figure 3:
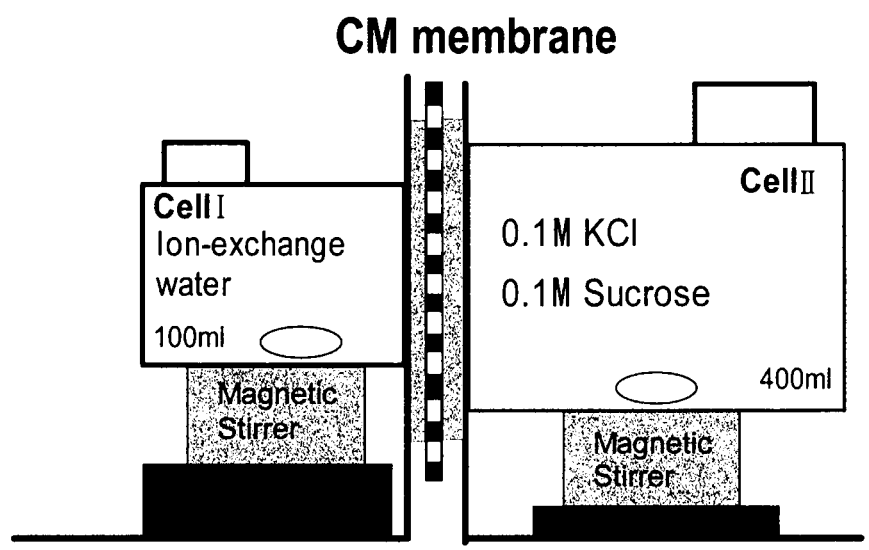
FIG. 3 is a schematic diagram of a diffusion dialysis testing device.

A diffusion permeation test was conducted using a device shown in FIG. 3. For diffusion dialysis of KCl as an electrolyte, a sample of a charge-mosaic membrane for measurement held by a folder was sandwiched by two cells. Cell I in which a conductivity electrode "3552-10D" from Horiba, Ltd. was inserted was filled with 100 mL of ion-exchanged water while Cell II was filled with 400 mL of a 0.1 M aqueous solution of KCl, and while stirring the solutions in both cells with stirrers, measurement was conducted at a constant temperature of 25° C.

For diffusion dialysis of sucrose as a nonelectrolyte, a sample of a charge-mosaic membrane for measurement held by a folder was sandwiched by two cells. Cell I was filled with 100 mL of ion-exchanged water while Cell II was filled with 400 mL of a 0.1 M aqueous solution of sucrose, and while stirring the solutions in both cells with stirrers, measurement was conducted at a constant temperature of 25° C.

A concentration of sucrose in Cell I was determined by collecting a 0.5 mL sample from Cell I by a pipetter at a given time and analyzing it by high performance liquid chromatography. For a KCl and a sucrose concentrations thus measured, a curve of variation with time was drawn and from a slope of a line obtained by straight-line approximation, a time rate of change $\Delta C^I_i/\Delta t$ for each concentration was calculated. Hereinafter, i denotes KCl or SUC (sucrose).

High performance liquid chromatography was conducted using the apparatus described below under the measurement conditions as described below.

(Apparatus)
Pump: "PU-980 Intelligent HPLC PUMP" from JEOL Ltd.;
Detector: "RI-2031 Plus Intelligent RI Detector" from JEOL Ltd.;
Autosampler: "AS-2055 Plus Intelligent Sampler" from JEOL Ltd.;
Column oven: "860-CO Column Oven" from JEOL Ltd.; and
Column: "WAKO-Sil II 3C18AR" from Wako Pure Chemical Industries, Ltd.

(Measurement Conditions)
Eluent: ultrapure water;
Liquid flow rate: 0.4 mL/min;
Column temperature: 40° C.

Fluxes ($J_{KCl}$ and $J_{SUC}$) for KCl and sucrose were calculated from the following equation.

$$J_i = V^I \times \Delta C^I_i / (S \times \Delta t) \times 10^{-7}$$

Permeability coefficients for KCl and sucrose ($P_{KCl}$ and $P_{SUC}$) were calculated from the following equation.

$$P_i = J_i \times d / (C^{II}_i - C^I_i) \times 10^{-1}$$

$J_i$: flux of ingredient i [mol·cm$^{-2}$·s$^{-1}$];
$P_i$: permeability coefficient of ingredient i [cm$^2$·s$^{-1}$];
$V^I$: amount of ion-exchanged water in Cell I [mL];
S: membrane effective area of a charge-mosaic membrane [m$^2$];
d: thickness of a charge-mosaic membrane [μm];
$\Delta C^I_i$: concentration of ingredient i in Cell I [mol/L];
$C^I_i$: initial concentration of ingredient i in Cell I [mol/L];
$C^{II}_i$: initial concentration of ingredient i in Cell II [mol/L];
$\Delta t$: permeation time [s].

Using a permeability coefficient $P_{KCl}$ for KCl and a permeability coefficient $P_{SUC}$ for sucrose determined, an electrolyte permselectivity a of KCl to sucrose in the charge-mosaic membrane was calculated from the following equation.

$$\alpha = P_{KCl} / P_{SUC}$$

(6) Ultimate Tensile Stress at Break

Using a JIS standard punch, an ion-exchange membrane was cut into dumbbell-shaped pieces with a width of 2 mm and a length of 3 cm as samples for measurement. Measurement was conducted using the Compact Table-Top Tester "EZ-Test500N" from Shimadzu Corporation with a distance between clips of 2 cm at 25° C. An ultimate tensile stress at break was calculated according to the following equation.

Ultimate tensile stress at break[MPa]=Stress at a break point[MPa]×Initial sectional area[$m^2$]/Sectional area at break [$m^2$]

(Synthesis of a Cationic Polymer P-1)

In a 6 liter separable flask equipped with a stirrer, a temperature sensor, a dropping funnel and a reflux condenser were charged 1120 g of vinyl acetate, 1680 g of methanol and 31.6 g of a 20% by weight solution of methacrylamidopropyltrimethylammonium chloride in methanol, and after the atmosphere of the system was substituted with nitrogen under stirring, the system was heated to an internal temperature of 60° C. To this system was added 20 g of methanol containing 0.4 g of 2,2'-azobisisobutyronitrile (AIBN), to initiate a polymerization reaction. The polymerization reaction was continued for 4 hours while 200 g of a 20% by weight solution of methacrylamidopropyltrimethylammonium chloride in methanol was added to the reaction system from the initiation of the polymerization, and then the polymerization reaction was quenched. At the quenching of the polymerization reaction, a solid concentration in the system, that is, a solid content to the whole polymerization reaction slurry, was 23.9% by weight. Next, unreacted vinyl acetate monomer was expelled by introducing methanol vapor into the system to provide a 55% by weight solution of a vinyl ester copolymer in methanol.

To the 55% by weight solution of a vinyl ester copolymer in methanol were, under stirring, sequentially added methanol and a 10% by weight solution of sodium hydroxide in methanol such that a molar ratio of sodium hydroxide to a vinyl acetate unit in the copolymer was 0.025 and the vinyl ester copolymer was contained in a solid concentration of 45% by weight, and a saponification reaction was initiated at 40° C.

Immediately after a gelated material was formed as the saponification reaction proceeded, the material was removed from the reaction system and pulverized, and then one hour after the formation of the gelated material, the pulverized material was neutralized by adding methyl acetate to provide a swollen cationic polymer of poly(vinyl alcohol-methacrylamidopropyltrimethylammonium chloride). Six times the mass of methanol was added to the swollen cationic polymer (liquor ratio: 6), and the polymer was washed under reflux for one hour, and then the cationic polymer was collected as a solid obtained by filtration. The polymer was dried at 65° C. for 16 hours. The resulting polymer was dissolved in deuterium oxide and analyzed by $^1$H-NMR at 400 MHz, which indicated that a content of the cationic monomer in the cationic polymer, that is, a proportion of the number of a methacrylamidopropyltrimethylammonium chloride monomer unit to the total number of monomer units in the polymer, was 2 mol %. A polymerization degree was 450 and a saponification degree was 98.5 mol %.

(Synthesis of a Cationic Polymer P-2 and Anionic Polymers P-3, P-4)

A cationic polymer P-2 and anionic polymers P-3 and P-4 were produced as described for P-1, except that the polymerization conditions such as the types and the initial amounts of vinyl acetate, methanol (MeOH) and a cationic or anionic monomer, the amount of a polymerization initiator (AIBN) and the portionwise addition amount of the cationic or anionic monomer, and the conditions of a saponification reaction were changed as shown in Table 1. The physical properties of the polymers prepared are shown in Table 1.

TABLE 1

| | | | Polymerization conditions | | | | | | |
|---|---|---|---|---|---|---|---|---|---|
| | | | Cationic or anionic monomer | | | | Polymerization | | |
| | Vinyl | | Initial amount MeOH sol. | | Portionwise added MeOH sol. | | Initially charged | zation initiator | Polymerization | Solid concen- |
| | acetate g | Type | Conc. wt % | Amount g | Conc. wt % | Amount g | MeOH g | (AIBN) g | time hr | tration wt % |
| P-1 | 1120 | MAPTAC*[1] | 20 | 31.6 | 20 | 200 | 1680 | 0.4 | 4 | 23.9 |
| P-2 | 2156 | MAPTAC*[1] | 20 | 60.8 | 20 | 290 | 644 | 0.8 | 4 | 33.7 |
| P-3 | 1120 | AMPS*[2] | 25 | 15.4 | 25 | 173 | 1680 | 0.4 | 4 | 24.1 |
| P-4 | 2156 | AMPS*[2] | 25 | 29.5 | 25 | 250 | 644 | 0.8 | 4 | 34.1 |

| | Saponification conditions | | Cationic or anionic polymer | | |
|---|---|---|---|---|---|
| | Solid concentration wt % | NaOH molar ratio — | Saponification degree mol % | Polymerization degree — | Content of a cationic or anionic monomer mol % |
| P-1 | 45 | 0.025 | 98.5 | 450 | 2 |
| P-2 | 30 | 0.025 | 98.5 | 1700 | 2 |
| P-3 | 45 | 0.025 | 98.5 | 450 | 2 |
| P-4 | 30 | 0.025 | 98.5 | 1700 | 2 |

*[1]MAPTAC: methacrylamidopropyltrimethylammonium chloride
*[2]AMPS: sodium 2-acrylamido-2-methylpropanesulfonate (Synthesis of PVA-1 and PVA-2)

According to the process described in JP 59-187003 (a polyvinyl alcohol polymer containing a terminal mercapto group and a process therefor), a polyvinyl alcohol containing a terminal mercapto group PVA-1 was synthesized. The PVA-1 thus prepared had a polymerization degree of 550 and a saponification degree of 98.5 mol %. Likewise, a polyvinyl alcohol containing a terminal mercapto group PVA-2 was synthesized. The PVA-2 thus prepared had a polymerization degree of 1550 and a saponification degree of 98.5 mol %.

(Synthesis of a Cationic Polymer P-5)

In a 3-liter four-necked separable flask equipped with a reflux condenser and a stirring blade were charged 1160 g of water and 344 g of PVA-1 as a polyvinyl alcohol containing a terminal mercapto group, and the mixture was heated with stirring to 95° C. for dissolving the vinyl alcohol polymer and then cooled to room temperature. To the aqueous solution was added ½ N sulfuric acid to adjust pH to 3.0. Separately, 183 g of methacrylamidepropyl trimethylammonium chloride was dissolved in 200 g of water, and the resulting solution was added to the previous aqueous solution with stirring, and then the mixture was heated to 70° C. while the system atmosphere was replaced by nitrogen by bubbling nitrogen gas into the aqueous solution for 30 min. After the replacement by nitrogen, to the aqueous solution was added portionwise 176 mL of a 2.5% aqueous solution of potassium persulfate over 1.5 hours to initiate block co-polymerization which was then allowed to proceed. The polymerization was allowed to further proceed by maintaining a system temperature at 75° C. for one hour, and the reaction was then cooled to give an aqueous solution of polyvinyl alcohol-polymethacrylamidepropyltrimethylammonium chloride block copolymer with a solid content of 25%. Apart of the resulting aqueous solution was dried, then dissolved in deuterium oxide and analyzed by $^1$H-NMR at 400 MHz, which indicated that a cationic monomer content in the block copolymer, that is, a proportion of the number of the methacrylamidepropyltrimethylammonium chloridemonomer unit to the total number of monomer units in the polymer was 10 mol %.

(Synthesis of Cationic Polymers P-6 to P-9)

Cationic block copolymers P-6 to P-9 were synthesized as described for P-5, except that 344 g of PVA-2 was charged as a polyvinyl alcohol containing a terminal mercapto group and the polymerization conditions including the type and the amount of a cationic monomer, the amount of water and the amount of a polymerization initiator (potassium persulfate) were changed as shown in Table 2. The physical properties of the cationic block copolymers thus obtained are shown in Table 2.

TABLE 2

| | Polymerization conditions | | | | | | | | Block copolymer | |
|---|---|---|---|---|---|---|---|---|---|---|
| | Terminal mercapto group PVA | | Cationic monomer | | Water | Initiator (potassium persulfate) | | Polymerization | Solid | 4% | Cationic monomer |
| | Type | Amount g | Type | Amount g | Amount g | Concentration wt % | Amount mL | time hr | concentration*4 wt % | Viscosity mPa·s | content mol % |
| P-5 | PVA-1 | 344 | MAPTAC*1 | 183 | 1360 | 2.5 | 176 | 1.5 | 25 | 6 | 10 |
| P-6 | PVA-2 | 344 | VTMAC*2 | 269 | 2750 | 2.5 | 121 | 1.5 | 18 | 18 | 15 |
| P-7 | PVA-2 | 344 | VTMAC*2 | 89.6 | 2250 | 2.5 | 121 | 1.5 | 15 | 16 | 5 |
| P-8 | PVA-2 | 344 | VTMAC*2 | 35.8 | 1950 | 2.5 | 121 | 1.5 | 15 | 14 | 2 |
| P-9 | PVA-2 | 344 | DADMAC*3 | 134 | 2700 | 2.5 | 121 | 1.5 | 15 | 18 | 10 |

*1MAPTAC: methacrylamidopropyltrimethylammonium chloride
*2VTMAC: vinylbenzyltrimethylammonium chloride
*3DADMAC: diallyldimethylammonium chloride
*4Solid content to the whole polymerization slurry (Synthesis of Anionic Polymers P-11 to P-14)

Anionic block copolymers P-11 to P-14 were prepared as described for P-5, except that the polymerization conditions including the type and the amount of a polyvinyl alcohol containing a terminal mercapto group, the type and the amount of an anionic monomer, the amount of water and the amount of a polymerization initiator (potassium persulfate) were changed as shown in Table 3. The physical properties of the anionic block copolymers thus prepared are shown in Table 3.

TABLE 3

| | Polymerization conditions | | | | | | | | Block copolymer | |
|---|---|---|---|---|---|---|---|---|---|---|
| | Terminal mercapto group PVA | | Anionic monomer | | Water | Initiator (potassium persulfate) | | Polymerization | Solid | 4% | Anionic monomer |
| | Type | Amount g | Type | Amount g | Amount g | Concentration wt % | Amount mL | time hr | concentration*3 wt % | Viscosity mPa·s | content mol % |
| P-11 | PVA-1 | 344 | AMPS*1 | 190 | 1340 | 2.5 | 192 | 1.5 | 25 | 6 | 10 |
| P-12 | PVA-2 | 344 | PStSS*2 | 258 | 2700 | 2.5 | 121 | 1.5 | 18 | 18 | 15 |
| P-13 | PVA-2 | 344 | PStSS*2 | 86 | 2200 | 2.5 | 121 | 1.5 | 15 | 16 | 5 |
| P-14 | PVA-2 | 344 | PStSS*2 | 34 | 1920 | 2.5 | 121 | 1.5 | 15 | 14 | 2 |

*1AMPS: sodium 2-acrylamido-2-methylpropanesulfonate
*2PStSS: sodium p-styrenesulfonate
*3Solid content to the whole polymerization slurry

Example 1

(Production of an Ion-exchange Membrane)

In a 200 mL Erlenmeyer flask were charged 90 mL of deionized water and then 22.5 g of the cationic polymer P-1, and then the mixture was heated in a water bath at 95° C., to dissolve the polymer P-1. Then, to the mixture was added deionized water to prepare an aqueous solution of the polymer at a concentration of 8%. A viscosity was 15 mPa·s (20° C.). This aqueous solution was charged in a syringe, which was then mounted to an ink-jet printer "NanoPrinter 1100D" from Microjet Corporation. The solution was applied on a 5 cm×5 cm area on a vinylone synthetic paper (basis weight: 50±5 g/m$^2$, thickness: 160±25 μm) as a supporting layer, by solid printing using the above ink-jet printer. Then, the product was dried at 25° C. under a 65% RH atmosphere for 16 hours. Then, the product was pressed by a hot press under the conditions of a temperature of 150° C. and a pressure of 10 kgf/cm$^2$ for 10 min. The film thus obtained was annealed at 170° C. for 30 min, to form physical crosslinking. Subsequently, the film was immersed in a 2 mol/L aqueous solution of an electrolyte, sodium sulfate for 24 hours. To the aqueous solution was added concentrated sulfuric acid to adjust the pH of the aqueous solution to 1, and then the film was immersed in a 0.05% by volume aqueous solution of glutaraldehyde, which was then stirred by a stirrer at 25° C. for 24 hours to conduct crosslinking. Here, the aqueous solution of glutaraldehyde was prepared by diluting glutaraldehyde (25% by volume) from Ishizu Chemicals Co. with water. After the crosslinking, the film was immersed in deionized water until the film reached swelling equilibrium, during which deionized water was replaced several times, to provide an ion-exchange membrane.

(Evaluation of an Ion-exchange Membrane)

The ion-exchange membrane thus produced was cut into pieces with a desired size, which were used as samples for measurement. The measurement samples were determined for a thickness (A) of the ion-exchange layer, a thickness (B) of the supporting layer, a dynamic transport number, a membrane resistance and an anti-organic fouling property as described above. The results obtained are shown in Table 4.

Example 2

An ion-exchange membrane was produced and evaluated as described in Example 1, except that 25.4 g of the cationic polymer P-2 was used in place of 22.5 g of the cationic polymer P-1, an aqueous solution of a polymer at a concentration of 21% was prepared by adding deionized water, and a screen printer was used in place of an ink-jet printer. The results obtained are shown in Table 4. Here, the screen printer was LS-34TV from Newlong Seimitsu Kogyo Co., Ltd. The aqueous solution had a viscosity of 98000 mPa·s (20° C.).

Example 3

An ion-exchange membrane was produced and evaluated as described in Example 1, except that 15.8 g of the cationic polymer P-2 was used in place of 22.5 g of the cationic polymer P-1, a 12% aqueous polymer solution was prepared by adding deionized water, and a dispenser printer was used in place of an ink-jet printer. The results obtained are shown in Table 4. Here, the dispenser printer was "SHOTMASTER500" from Musashi Engineering, Inc. The aqueous solution had a viscosity of 2000 mPa·s (20° C.).

Example 4

An ion-exchange membrane was produced and evaluated as described in Example 1, except that instead of dissolving 22.5 g of the cationic polymer P-1, 22.5 g of polyvinyl alcohol was added to 90 mL of deionized water, the mixture was heated with stirring in a water bath at 95° C. for dissolving a solid, 28 g of polydiallyldimethylammonium chloride was added and dissolved and deionized water was added to prepare a 8% aqueous polymer solution. The results are shown in Table 4. Here, polyvinyl alcohol was "PVA105" from Kuraray Co., Ltd. The "PVA105" has a polymerization degree of 550 and a saponification degree of 98.5 mol %. The polydiallyldimethylammonium chloride was "polydiallyldimethylammonium chloride" from Sigma-Aldrich Co. For the "polydiallyldimethylammonium chloride", a concentration was 20% and a molecular weight was 400000 to 500000. A solid weight ratio of PVA105 to the polydiallyldimethylammonium chloride was 80/20. The aqueous solution had a viscosity of 15 mPa·s (20° C.).

Example 5

An ion-exchange membrane was produced and evaluated as described in Example 4, except that 110 mL of deionized water was used instead of 90 mL, polyvinyl alcohol was 12.3 g of "PVA135" from Kuraray Co., Ltd. in place of 22.5 g of "PVA105", the amount of polydiallyldimethylammonium chloride was 15.4 g instead of 56 g, deionized water was added to prepare a 9% aqueous polymer solution and printing was conducted using the screen printer used in Example 2 instead of an ink-jet printer. The results obtained are shown in Table 4. The "PVA135" has a polymerization degree of 3500 and a saponification degree of 98.5 mol %. A solid weight ratio of PVA135 to the polydiallyldimethylammonium chloride was 80/20. The aqueous solution had a viscosity of 90000 mPa·s (20° C.).

Example 6

An ion-exchange membrane was produced and evaluated as described in Example 1, except that the cationic polymer P-5 was used in place of the cationic polymer P-1 and a concentration of an aqueous polymer solution prepared was 7% instead of 8%. The results obtained are shown in Table 4.

Examples 7 to 16

Ion-exchange membranes were produced and evaluated as described in Example 1, except that the type of a cationic polymer used, a concentration of an aqueous polymer solution prepared, a annealing temperature, a hot-pressing temperature were changed as shown in Table 4 and a screen printer was used in place of an ink-jet printer, and a thickness (A) of ion-exchange layers formed was changed as shown in Table 4. The results obtained are shown in Table 4. In Example 16, hot pressing was omitted.

Comparative Example 1

"Neosepta AM-1" from Tokuyama Corporation, an anion-exchange membrane, was used as an ion-exchange membrane and evaluated as described above. The results obtained are shown in Table 4.

Comparative Example 2

The cationic polymer P-2 was heated and dissolved in hot water at 95° C. for 2 hours to prepare a 10% aqueous polymer solution. The aqueous solution thus prepared was applied on an acrylic cast plate with 270 mm long×210 mm wide and, after removing an excessive solution and bubbles, dried on a hot plate at 50° C. for 24 hours to form a film. The film thus prepared was annealed at 170° C. for 30 min, then subjected to crosslinking as described in Example 1, to produce an ion-exchange membrane, which was evaluated. The measurement results obtained are shown in Table 4.

Comparative Example 3

An ion-exchange membrane was produced and evaluated as described in Example 2 except that crosslinking was omitted. In the course of measurement, the ion-exchange membrane was dissolved, so that membrane properties could not be evaluated.

TABLE 4

| | Cationic polymer | | | | | | |
|---|---|---|---|---|---|---|---|
| | Type | Ionic monomer content mol % | Concentration of polymer aqueous solution. wt % | Viscosity of polymer aqueous solution mPa·s | Printing method | Annealing Temperature ° C. | Hot pressing Temperature ° C. |
| Example 1 | P-1 | 2 | 8 | 15 | Inkjet printing | 170 | 150 |
| Example 2 | P-2 | 2 | 21 | 98000 | Screen printing | 170 | 150 |
| Example 3 | P-2 | 2 | 12 | 2000 | Dispenser printing | 170 | 150 |
| Example 4 | PVA105/PDADMAC *[1] | 2 | 8 | 15 | Inkjet printing | 170 | 150 |
| Example 5 | PVA135/PDADMAC *[1] | 2 | 9 | 90000 | Screen printing | 170 | 150 |
| Example 6 | P-5 | 10 | 7 | 15 | Inkjet printing | 170 | 150 |
| Example 7 | P-6 | 15 | 20 | 95000 | Screen printing | 170 | 150 |
| Example 8 | P-6 | 15 | 20 | 95000 | Screen printing | 120 | 150 |
| Example 9 | P-6 | 15 | 20 | 95000 | Screen printing | 90 | 150 |
| Example 10 | P-7 | 5 | 20 | 93000 | Screen printing | 170 | 150 |
| Example 11 | P-8 | 2 | 20 | 90000 | Screen printing | 170 | 150 |
| Example 12 | P-9 | 10 | 20 | 95000 | Screen printing | 170 | 150 |
| Example 13 | P-6 | 15 | 20 | 95000 | Screen printing | 170 | 110 |
| Example 14 | P-6 | 15 | 20 | 95000 | Screen printing | 170 | 90 |
| Example 15 | P-2 | 2 | 21 | 98000 | Screen printing | 170 | 150 |
| Example 16 | P-2 | 2 | 21 | 98000 | Screen printing | 170 | — |
| Comparative Example 1 | AM-1 *[2] | — | | | | | |
| Comparative Example 2 | P-2 | 2 | 10 | 1000 | — | 170 | — |
| Comparative Example 3 | P-2 | 2 | 21 | 98000 | Screen printing | 170 | 150 |

| | Layer thickness | | | Membrane properties | | |
|---|---|---|---|---|---|---|
| | Ion-exchange layer (A) μm | Supporting layer (B) μm | A/B — | Dynamic transport number — | Membrane resistance Ω·cm² | Anti-organic fouling property mV |
| Example 1 | 5 | 100 | 0.05 | 0.94 | 0.32 | 50 |
| Example 2 | 5 | 100 | 0.05 | 0.94 | 0.32 | 50 |
| Example 3 | 5 | 100 | 0.05 | 0.94 | 0.32 | 50 |
| Example 4 | 5 | 100 | 0.05 | 0.94 | 0.32 | 50 |
| Example 5 | 5 | 100 | 0.05 | 0.94 | 0.32 | 50 |
| Example 6 | 5 | 100 | 0.05 | 0.98 | 0.28 | 30 |
| Example 7 | 5 | 100 | 0.05 | 0.98 | 0.25 | 15 |
| Example 8 | 15 | 100 | 0.15 | 0.98 | 0.43 | 15 |
| Example 9 | 18 | 100 | 0.18 | 0.98 | 0.51 | 15 |
| Example 10 | 5 | 100 | 0.05 | 0.98 | 0.36 | 40 |
| Example 11 | 5 | 100 | 0.05 | 0.82 | 0.39 | 50 |
| Example 12 | 5 | 100 | 0.05 | 0.98 | 0.31 | 30 |
| Example 13 | 5 | 100 | 0.05 | 0.93 | 0.32 | 15 |
| Example 14 | 5 | 100 | 0.05 | 0.86 | 0.32 | 15 |
| Example 15 | 25 | 100 | 0.25 | 0.94 | 0.89 | 50 |
| Example 16 | 5 | 100 | 0.05 | 0.84 | 0.32 | 50 |
| Comparative Example 1 | 100 | — | — | 0.98 | 1.62 | 210 |
| Comparative Example 2 | 100 | — | — | 0.94 | 1.04 | 175 |
| Comparative Example 3 | | | | *[3] | | |

*[1] PDADMAC: polydiallyldimethylammonium chloride
*[2] AM-1 Commercially available anion-exchange membrane "Neosepta AM-1" (from Tokuyama Corporation)
*[3] Membrane properties could not be measured due to dissolution of an ion-exchange membrane.

Examples 17 to 29

Ion-exchange membranes were produced as described in Example 1, except that the type of an anionic polymer used, a concentration of a an aqueous polymer solution prepared, a printing method, an annealing temperature, a hot-pressing temperature and a thickness (B) of ion-exchange layers were changed as shown in Table 5. The results obtained are shown in Table 5. In Examples 20 and 21, poly(sodium styrenesulfonate) was "poly(sodium 4-styrenesulfonate)" from Wako Pure Chemical Industries, Ltd. A solid weight ratio of the polyvinyl alcohol to the poly (sodium styrenesulfonate) was 80/20.

Comparative Example 4

A cation-exchange membrane, "Neosepta CM-1" from Tokuyama Corporation, was used as an ion-exchange membrane and evaluated as described above. The measurement results obtained are shown in Table 5.

Comparative Example 5

An ion-exchange membrane was produced and evaluated as described in Comparative Example 2, substituting the anionic polymer P-4 for the cationic polymer P-2. The results obtained are shown in Table 5.

Comparative Example 6

An ion-exchange membrane was produced and evaluated as described in Comparative Example 3, substituting the anionic polymer P-4 for the cationic polymer P-2. In the course of measurement, the ion-exchange membrane was dissolved, so that membrane properties could not be evaluated.

TABLE 5

| | Anionic polymer | | | | | | |
| --- | --- | --- | --- | --- | --- | --- | --- |
| | Type | Ionic monomer content mol % | Concentration of polymer aqueous solution wt % | Viscosity of polymer aqueous solution mPa·s | Printing method | Annealing Temperature °C. | Hot pressing Temperature °C. |
| Example 17 | P-3 | 2 | 8 | 15 | Inkjet printing | 170 | 150 |
| Example 18 | P-4 | 2 | 21 | 97000 | Screen printing | 170 | 150 |
| Example 19 | P-4 | 2 | 12 | 2100 | Dispenser printing | 170 | 150 |
| Example 20 | PVA105/ PStSS *[1] | 2 | 8 | 18 | Inkjet printing | 170 | 150 |
| Example 21 | PVA135/ PStSS *[1] | 2 | 9 | 95000 | Screen printing | 170 | 150 |
| Example 22 | P-11 | 10 | 6 | 15 | Inkjet printing | 170 | 150 |
| Example 23 | P-12 | 15 | 19 | 100000 | Screen printing | 170 | 150 |
| Example 24 | P-12 | 15 | 19 | 100000 | Screen printing | 120 | 150 |
| Example 25 | P-12 | 15 | 19 | 100000 | Screen printing | 90 | 150 |
| Example 26 | P-13 | 5 | 19 | 93000 | Screen printing | 170 | 150 |
| Example 27 | P-14 | 2 | 19 | 90000 | Screen printing | 170 | 150 |
| Example 28 | P-4 | 2 | 21 | 97000 | Screen printing | 170 | 150 |
| Example 29 | P-4 | 2 | 21 | 97000 | Screen printing | 170 | — |
| Comparative Example 4 | CM-1 *[2] | | | | | | |
| Comparative Example 5 | P-4 | 2 | 10 | 1050 | — | 170 | — |
| Comparative Example 6 | P-4 | 2 | 21 | 97000 | Screen printing | 170 | 150 |

| | Layer thickness | | | Membrane properties | | |
| --- | --- | --- | --- | --- | --- | --- |
| | Ion-exchange layer (A) μm | Supporting layer (B) μm | A/B | Dynamic transport number | Membrane resistance Ω·cm² | Anti-organic fouling property mV |
| Example 17 | 5 | 100 | 0.05 | 0.94 | 0.33 | 50 |
| Example 18 | 5 | 100 | 0.05 | 0.94 | 0.33 | 50 |
| Example 19 | 5 | 100 | 0.05 | 0.94 | 0.33 | 50 |
| Example 20 | 5 | 100 | 0.05 | 0.94 | 0.33 | 50 |
| Example 21 | 5 | 100 | 0.05 | 0.94 | 0.33 | 50 |
| Example 22 | 5 | 100 | 0.05 | 0.98 | 0.28 | 30 |
| Example 23 | 5 | 100 | 0.05 | 0.98 | 0.25 | 15 |
| Example 24 | 15 | 100 | 0.15 | 0.98 | 0.43 | 15 |
| Example 25 | 18 | 100 | 0.18 | 0.98 | 0.51 | 15 |
| Example 26 | 5 | 100 | 0.05 | 0.98 | 0.36 | 40 |
| Example 27 | 5 | 100 | 0.05 | 0.83 | 0.39 | 50 |
| Example 28 | 25 | 100 | 0.25 | 0.94 | 0.89 | 50 |
| Example 29 | 5 | 100 | 0.05 | 0.83 | 0.33 | 50 |
| Comparative Example 4 | 100 | — | — | 0.98 | 1.63 | 200 |
| Comparative Example 5 | 100 | — | — | 0.94 | 1.04 | 50 |
| Comparative Example 6 | | | | *[3] | | |

*[1] PStSS: sodium p-polystyrenesulfonate
*[2] CM-1: Commercially available cation-exchange membrane "Neosepta CM-1" (from Tokuyama Corporation)
*[3] Membrane properties could not be measured due to dissolution of an ion-exchange membrane.

From the results in Table 4, it can be seen that an anion-exchange membrane can be excellent in a dynamic transport number, a membrane resistance and anti-organic fouling by applying a polyvinyl alcohol containing a cationic-group or a mixture of a polymer containing a cationic-group and a cationic-group-free polyvinyl alcohol as a cationic polymer on a supporting layer by printing and then hot-pressing the product (Examples 1 to 15). Particularly, it can be seen that when a ratio (A/B) of a thickness (A) of an ion-exchange layer made of a cationic polymer to a thickness (B) of a supporting layer is 0.1 or less, a membrane resistance is further improved (Examples 1 to 7, Examples 10 to 14 and 16). It can be also seen that when a content of an ionic monomer in a cationic polymer is 5 mol % or more, a membrane has a dynamic transport number comparable to that of a commercially available ion-exchange membrane (Examples 6, 7, 10 and 12). In contrast, it can be seen that a single membrane with a thickness of 100 μm prepared by cast film formation exhibits poor membrane resistance (Comparative Example 2). Furthermore, without crosslinking, ion-exchange layer were dissolved, so that membrane properties could not be measured (Comparative Example 3).

From the results in Table 5, it can be seen that a cation-exchange membrane can be excellent in a dynamic transport number, a membrane resistance and anti-organic fouling by applying a polyvinyl alcohol containing an anionic-group or a mixture of a polymer containing an anionic-group and an anionic-group-free polyvinyl alcohol as an anionic polymer on a supporting layer by printing and then hot-pressing the product (Examples 17 to 28). Particularly, it can be seen that when a ratio (A/B) of a thickness (A) of ion-exchange layer made of an anionic polymer to a thickness (B) of a supporting layer is 0.1 or less, a membrane resistance is further improved (Examples 17 to 23, Examples 26, 27 and 29). It can be also seen that when a content of an ionic monomer in an anionic polymer is 5 mol % or more, a membrane has a dynamic transport number comparable to that of a commercially available ion-exchange membrane (Examples 22, 23 and 26). In contrast, it can be seen that a single membrane with a thickness of 100 μm prepared by cast film formation exhibits poor membrane resistance (Comparative Example 5). Furthermore, without crosslinking, ion-exchange layer were dissolved, so that membrane properties could not be measured (Comparative Example 6).

Example 30

(Production of a Charge-mosaic Membrane)

Figure 4:
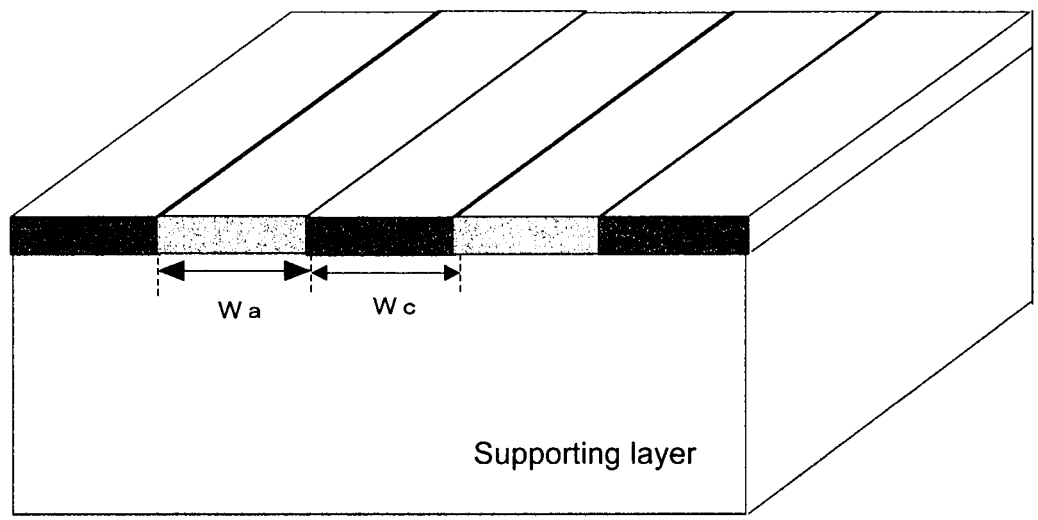
FIG. 4 is a schematic diagram of a charge-mosaic layer as an ion-exchange layer in the present invention, which is printed on a supporting layer in a striped manner.

In a 200 mL Erlenmeyer flask were placed 90 mL of deionized water and then 22.5 g of the cationic polymer P-1, and then the mixture was heated in a water bath at 95° C., to dissolve the polymer P-1. Then, to the mixture was added deionized water to prepare an aqueous solution of the cationic polymer at a concentration of 8%. A viscosity was 15 mPa·s (20° C.). In a separate 200 mL Erlenmeyer flask were placed 90 mL of deionized water and then 22.5 g of the anionic polymer P-3, and then the mixture was heated in a water bath at 95° C., to dissolve the polymer P-3. Then, to the mixture was added deionized water to prepare an aqueous solution of the anionic polymer at a concentration of 8%. A viscosity was 15 mPa·s (20° C.). These aqueous polymer solutions were charged in separate syringes, which were then mounted to an ink-jet printer "NanoPrinter 1100D" from Microjet Corporation. These solutions were applied on a vinylone synthetic paper (basis weight: 50±5 g/m$^2$, thickness: 160±25 μm) as a supporting layer in a striped manner as shown in FIG. 4, by printing using the above ink-jet printer. Both cationic polymer domains and anionic polymer domains constituting a charge-mosaic layer which were formed as lines had a line width of 50 μm. Then, the product was dried at 25° C. under a 65% RH atmosphere for 16 hours. Then, the product was pressed by a hot press under the conditions of a temperature of 150° C. and a pressure of 10 kgf/cm$^2$ for 10 min. The film thus obtained was annealed at 170° C. for 30 min, to form physical crosslinking. Subsequently, the film was immersed in a 2 mol/L aqueous solution of an electrolyte, sodium sulfate for 24 hours. To the aqueous solution was added concentrated sulfuric acid to adjust the pH of the aqueous solution to 1, and then the film was immersed in a 0.05% by volume aqueous solution of glutaraldehyde, which was then stirred by a stirrer at 25° C. for 24 hours to conduct crosslinking. Here, the aqueous solution of glutaraldehyde was prepared by diluting glutaraldehyde (25% by volume) from Ishizu Chemicals Co. with water. After the crosslinking, the film was immersed in deionized water until the film reached swelling equilibrium, during which deionized water was replaced several times, to provide a charge-mosaic membrane of the present invention. Table 6 summarizes the above producing process.

(Evaluation of a Charge-mosaic Membrane)

The charge-mosaic membrane thus produced was cut into pieces with a desired size, which were used as samples for measurement. The measurement samples were determined for a thickness (A) of the charge-mosaic layer and an ultimate tensile stress at break as described above, and a diffusion dialysis test was conducted. The results obtained are shown in Table 7.

Example 31

A charge-mosaic membrane was produced and evaluated as described in Example 1, except that in Example 30, 25.4 g of the cationic polymer P-2 was used in place of 22.5 g of the cationic polymer P-1 and an aqueous solution of a cationic polymer at a concentration of 21% was prepared by adding deionized water, and 25.4 g of the anionic polymer P-4 was used in place of 22.5 g of the anionic polymer P-3 and an aqueous solution of an anionic polymer at a concentration of 21% was prepared by adding deionized water, and a screen printer was used in place of an ink-jet printer. The producing process is summarized in Table 6 and the results obtained are shown in Table 7. Here, the screen printer was LS-34TV from Newlong Seimitsu Kogyo Co., Ltd. The aqueous cationic-polymer solution and the aqueous anionic-polymer solution had a viscosity of 98000 mPa·s (20° C.) and 97000 mPa·s (20° C.), respectively.

Example 32

A charge-mosaic membrane was produced and evaluated as described in Example 1, except that in Example 30, 15.8 g of the cationic polymer P-2 was used in place of 22.5 g of the cationic polymer P-1 and a 12% aqueous cationic polymer solution was prepared by adding deionized water and 15.8 g of the anionic polymer P-4 was used in place of 22.5 g of the anionic polymer P-3 and a 12% aqueous anionic polymer solution was prepared by adding deionized water, and a dispenser printer was used in place of an ink-jet printer. The producing process is summarized in Table 6 and the results obtained are shown in Table 7. Here, the dispenser printer was "SHOTMASTER500" from Musashi Engineering, Inc. The aqueous cationic polymer solution and the aqueous anionic polymer had a viscosity of 2000 mPa·s (20° C.) and 2100 mPa·s (20° C.), respectively.

Example 33

A charge-mosaic membrane was produced and evaluated as described in Example 1, except that in Example 30, instead of dissolving 22.5 g of the cationic polymer P-1, 22.5 g of polyvinyl alcohol was added to 90 mL of deionized water and the mixture was heated with stirring in a water bath at 95° C. for dissolving a solid, then 28 g of polydiallyldimethylammonium chloride was added and dissolved and deionized water was added to prepare a 8% aqueous cationic polymer solution. And instead of dissolving 22.5 g of the anionic polymer P-3, 22.5 g of polyvinyl alcohol was added to 90 mL of deionized water and the mixture was heated with stirring in a water bath at 95° C. for dissolving a solid, then 5.6 g of poly (sodium styrenesulfonate) was added and dissolved and deionized water was added to prepare a 8% aqueous anionic polymer solution. The producing process is summarized in Table 6 and the results obtained are shown in Table 7. The aqueous cationic polymer solution and the aqueous anionic polymer solution had a viscosity of 15 mPa·s (20° C.) and 18 mPa·s (20° C.), respectively. Here, polyvinyl alcohol was "PVA105" from Kuraray Co., Ltd. The "PVA105" has a polymerization degree of 550 and a saponification degree of 98.5 mol %. The polydiallyldimethylammonium chloride was polydiallyldimethylammonium chloride from Sigma-Aldrich Co. For the polydiallyldimethylammonium chloride, a concentration was 20% and a molecular weight was 400000 to 500000. A solid weight ratio of PVA105 to the polydiallyldimethylammonium chloride was 80/20. Furthermore, poly(sodium styrenesulfonate) was poly(sodium 4-styrenesulfonate) from Wako Pure ChemicalIndustries, Ltd. A solid weight ratio of the polyvinyl alcohol to the poly (sodium styrenesulfonate) was 80/20.

Example 34

A charge-mosaic membrane was produced and evaluated as described in Example 33, except that 110 mL of deionized water was used instead of 90 mL, polyvinyl alcohol was 12.3 g of "PVA135" from Kuraray Co., Ltd. in place of 22.5 g of "PVA105", the amount of polydiallyldimethylammonium chloride was 15.4 g instead of 56 g, deionized water was added to prepare a 9% aqueous cationic polymer solution. And 110 mL of deionized water was used instead of 90 mL, polyvinyl alcohol was 12.3 g of "PVA135" in place of 22.5 g of "PVA105", the amount of poly(sodium styrenesulfonate) was 3.1 g instead of 11.3 g, deionized water was added to prepare a 9% aqueous anionic polymer solution, and printing was conducted using the screen printer used in Example 31 instead of an ink-jet printer. The producing process is summarized in Table 6 and the results obtained are shown in Table 7. The aqueous cationic polymer solution and the aqueous anionic polymer solution had a viscosity of 90000 mPa·s (20° C.) and 95000 mPa·s (20° C.), respectively. The "PVA135" has a polymerization degree of 3500 and a saponification degree of 98.5 mol %. A solid weight ratio of PVA135 to polydiallyldimethylammonium chloride was 80/20. A solid weight ratio of PVA135 to poly(sodium styrenesulfonate) was 80/20.

Example 35

A charge-mosaic membrane was produced and evaluated as described in Example 30, except that the cationic polymer P-5 was used in place of the cationic polymer P-1 and a concentration of an aqueous cationic polymer solution prepared was 7% instead of 8%, and the anionic polymer P-11 was used in place of the anionic polymer P-3 and a concentration of an aqueous anionic polymer solution prepared was 6% instead of 8%. The producing process is summarized in Table 6 and the results obtained are shown in Table 7.

Examples 36 to 45

Charge-mosaic membranes were produced and evaluated as described in Example 30, except that the types of a cationic polymer and an anionic polymer used, concentrations of an aqueous cationic polymer solution and an aqueous anionic polymer solution prepared, an annealing temperature, a hot-pressing temperature were changed as shown in Table 6 and a screen printer was used in place of an ink-jet printer, and a thickness (A) of a charge-mosaic membrane formed was changed as shown in Table 7. The producing process is summarized in Table 6 and the results obtained are shown in Table 7. In Example 45, hot pressing was omitted.

Examples 46 and 47

Charge-mosaic membranes were produced and evaluated as described in Example 35, except that sizes of cationic polymer domains and anionic polymer domains in a charge-mosaic layer were changed as shown in Table 7. The producing process is summarized in Table 6 and the results obtained are shown in Table 7.

Comparative Example 7

(Production of a Charge-mosaic Membrane by Lamination Technique)

The cationic polymer P-1 was heated and dissolved in hot water at 95° C. for 2 hours to prepare an aqueous cationic polymer solution. Likewise, an aqueous anionic polymer solution was prepared from the anionic polymer P-3. Each of the aqueous solution thus prepared was applied on an acrylic cast plate with 270 mm long×210 mm wide and, after removing an excessive solution and bubbles, dried on a hot plate at 50° C. for 24 hours to form both cationic polymer film and anionic polymer film. These films thus formed were alternately laminated via a polyvinyl alcohol "PVA124" from Kuraray Co., Ltd. as an adhesive, to prepare a laminated charge block. The block thus prepared was cut by a laboratory cutter perpendicularly to the lamination plane, and as described in Example 30, annealed at 170° C. for 30 min and then subjected to crosslinking, to provide a charge-mosaic membrane by lamination technique, which was then evaluated. The manufacturing process is summarized in Table 6 and the results obtained are shown in Table 7. The membrane had a thickness of 150 μm.

Comparative Example 8

For a charge-mosaic membrane "Desalton" from Tosoh Corporation, data on membrane properties described in Non-patent Reference 3 are shown in Table 7.

Comparative Example 9

A charge-mosaic membrane was produced and evaluated as described in Example 31, except that crosslinking was omitted. The producing process is summarized in Table 6. In the course of measurement, the charge-mosaic membrane was dissolved, so that membrane properties could not be evaluated.

TABLE 6

| | Cationic polymer domain | | | | Anionic polymer domain | | | | | |
|---|---|---|---|---|---|---|---|---|---|---|
| | Cationic polymer Type | Content of a cationic monomer mol % | Concentration of polymer aqueous solution wt % | Viscosity of polymer aqueous solution mPa·s | Anionic polymer Type | Content of an anionic monomer mol % | Concentration of polymer aqueous solution wt % | Viscosity of polymer aqueous solution mPa·s | Printing method | Annealing Temperature ° C. | Hot pressing Temperature ° C. |
| Example 30 | P-1 | 2 | 8 | 15 | P-3 | 2 | 8 | 15 | Ink-jet printing | 170 | 150 |
| Example 31 | P-2 | 2 | 21 | 98000 | P-4 | 2 | 21 | 97000 | Screen printing | 170 | 150 |
| Example 32 | P-2 | 2 | 12 | 2000 | P-4 | 2 | 12 | 2100 | Dispenser printing | 170 | 150 |
| Example 33 | PVA105/PDADMAC*1 | 2 | 8 | 15 | PVA105/PStSS*2 | 2 | 8 | 18 | Ink-jet printing | 170 | 150 |
| Example 34 | PVA135/PDADMAC*1 | 2 | 9 | 90000 | PVA135/PStSS*2 | 2 | 9 | 95000 | Screen printing | 170 | 150 |
| Example 35 | P-5 | 10 | 7 | 15 | P-11 | 10 | 6 | 15 | Ink-jet printing | 170 | 150 |
| Example 36 | P-6 | 15 | 20 | 95000 | P-12 | 15 | 19 | 100000 | Screen printing | 170 | 150 |
| Example 37 | P-6 | 15 | 20 | 95000 | P-12 | 15 | 19 | 100000 | Screen printing | 120 | 150 |
| Example 38 | P-6 | 15 | 20 | 95000 | P-12 | 15 | 19 | 100000 | Screen printing | 90 | 150 |
| Example 39 | P-7 | 5 | 20 | 93000 | P-13 | 5 | 19 | 93000 | Screen printing | 170 | 150 |
| Example 40 | P-8 | 2 | 20 | 90000 | P-14 | 2 | 19 | 90000 | Screen printing | 170 | 150 |
| Example 41 | P-9 | 10 | 20 | 95000 | P-11 | 10 | 6 | 15 | Screen printing | 170 | 150 |
| Example 42 | P-6 | 15 | 20 | 95000 | P-12 | 15 | 19 | 100000 | Screen printing | 170 | 110 |
| Example 43 | P-6 | 15 | 20 | 95000 | P-12 | 15 | 19 | 100000 | Screen printing | 170 | 90 |
| Example 44 | P-2 | 2 | 21 | 98000 | P-4 | 10 | 21 | 97000 | Screen printing | 170 | 150 |
| Example 45 | P-2 | 2 | 21 | 98000 | P-4 | 2 | 21 | 97000 | Screen printing | 170 | — |
| Example 46 | P-5 | 10 | 7 | 15 | P-11 | 10 | 6 | 15 | Ink-jet printing | 170 | 150 |
| Example 47 | P-5 | 10 | 7 | 15 | P-11 | 10 | 6 | 15 | Ink-jet printing | 170 | 150 |
| Comparative Example 7 | P-1 | 2 | — | — | P-3 | 2 | — | — | — | 170 | — |
| Comparative Example 8 | Commercially available charge-mosaic membrane "Desalton" (from Tosoh Corporation) | | | | | | | | | | |
| Comparative Example 9 | P-2 | 2 | 21 | 98000 | P-4 | 2 | 21 | 97000 | Screen printing | 170 | 150 |

*1 PDADMAC: polydiallyldimethylammonium chloride
*2 PStSS: sodium p-polystyrenesulfonate

TABLE 7

| | Domain size | | Film thickness | | | Ultimate tensile stress at break | Diffusion dialysis test | | | | |
|---|---|---|---|---|---|---|---|---|---|---|---|
| | Wc μm | Wa μm | Charge-mosaic layer (A) μm | Supporting layer (B) μm | A/B — | MD direction *3 MPa | $J_{KCl}$ *5 | $J_{SUC}$ *5 | $P_{KCl}$ *6 | $P_{SUC}$ *6 | α — |
| Example 30 | 50 | 50 | 5 | 100 | 0.05 | 31 | 5600 | 2.6 | 280 | 0.13 | 2154 |
| Example 31 | 50 | 50 | 5 | 100 | 0.05 | 31 | 5600 | 2.6 | 280 | 0.13 | 2154 |
| Example 32 | 50 | 50 | 5 | 100 | 0.05 | 31 | 5600 | 2.6 | 280 | 0.13 | 2154 |
| Example 33 | 50 | 50 | 5 | 100 | 0.05 | 31 | 5500 | 2.6 | 275 | 0.13 | 2115 |
| Example 34 | 50 | 50 | 5 | 100 | 0.05 | 31 | 5500 | 2.6 | 275 | 0.13 | 2115 |
| Example 35 | 50 | 50 | 5 | 100 | 0.05 | 31 | 5800 | 2.6 | 290 | 0.13 | 2231 |
| Example 36 | 50 | 50 | 5 | 100 | 0.05 | 31 | 6800 | 2.7 | 340 | 0.135 | 2519 |
| Example 37 | 50 | 50 | 15 | 100 | 0.15 | 31 | 2267 | 3.9 | 340 | 0.585 | 581 |
| Example 38 | 50 | 50 | 18 | 100 | 0.18 | 31 | 1700 | 3.7 | 306 | 0.666 | 459 |
| Example 39 | 50 | 50 | 5 | 100 | 0.05 | 31 | 6200 | 2.7 | 310 | 0.135 | 2296 |
| Example 40 | 50 | 50 | 5 | 100 | 0.05 | 31 | 6000 | 2.7 | 300 | 0.135 | 2222 |
| Example 41 | 50 | 50 | 5 | 100 | 0.05 | 31 | 5800 | 2.6 | 290 | 0.13 | 2231 |
| Example 42 | 50 | 50 | 5 | 100 | 0.05 | 31 | 6300 | 2.6 | 315 | 0.13 | 2423 |
| Example 43 | 50 | 50 | 5 | 100 | 0.05 | 31 | 6000 | 2.6 | 300 | 0.13 | 2308 |
| Example 44 | 50 | 50 | 25 | 100 | 0.25 | 31 | 1120 | 2.6 | 280 | 0.65 | 431 |
| Example 45 | 50 | 50 | 5 | 100 | 0.05 | 31 | 1550 | 3.1 | 77.5 | 0.155 | 500 |
| Example 46 | 5 | 5 | 5 | 100 | 0.05 | 31 | 8600 | 2.6 | 430 | 0.13 | 3308 |
| Example 47 | 100 | 100 | 5 | 100 | 0.05 | 31 | 5500 | 2.8 | 275 | 0.14 | 1964 |
| Comparative Example 7 | 100 | 100 | 150 | — | — | 6 | 290 | 0.13 | 435 | 0.195 | 2231 |
| Comparative Example 8 *4 | — | — | 300 | — | — | — | 92500 | 2400 | 279000 | 7200 | 39 |
| Comparative Example 9 | | | | | | *7 | | | | | |

*1 PDADMAC: polydiallyldimethylammonium chloride
*2 PStSS: sodium p-polystyrenesulfonate
*3 Stress in a direction parallel to a charge-mosaic layer
*4 from J. Membr. Sci., Vol. 65, p. 129 (1992)
*5 Unit: $10^{-11}$ mol · cm$^{-2}$ · s$^{-1}$
*6 Unit: $10^{-9}$ cm$^2$ · s$^{-1}$
*7 Membrane properties could not be measured because a charge-mosaic layer was dissolved.

From the results in Tables 6 and 7, it can be seen that by applying a polyvinyl alcohol containing a cationic-group or a mixture of a polymer containing a cationic-group and a cationic-group-free polyvinyl alcohol on a supporting layer by printing, and further applying a polyvinyl alcohol containing an anionic-group or a mixture of a polymer containing an anionic-group and an anionic-group-free polyvinyl alcohol on the supporting layer by printing and then hot-pressing the product, a charge-mosaic membrane obtained exhibits a large salt permeation flux and excellent electrolyte permselectivity (Examples 30 to 44, 46 and 47). It can be also seen that the use of a supporting layer improves mechanical strength of a charge-mosaic membrane obtained. Furthermore, it can be seen that when a ratio (A/B) of a thickness (A) of a charge-mosaic layer to a thickness (B) of a supporting layer is 0.1 or less, a salt permeation flux is satisfactory (Examples 30 to 36, 39 to 43, 46 and 47). It can be also seen that when both cationic monomer content in a cationic polymer and anionic monomer content in an anionic polymer are 5 mol % or more, the membrane exhibits excellent electrolyte permselectivity (Examples 35 to 39, 41 to 43, 46 and 47). In contrast, it can be seen that a charge-mosaic membrane with a thickness of 150 μm produced by lamination technique exhibit a lower salt permeation flux (Comparative Example 7). Furthermore, without crosslinking, a charge-mosaic layer was dissolved, so that membrane properties could not be measured (Comparative Example 9).

The invention claimed is:

1. A ion exchange membrane, comprising :
   an ion-exchange layer comprising [at least one selected from the group consisting of] a cationic and an anionic polymer; and
   a supporting layer,
   wherein the ion-exchange layer is formed on the supporting layer by printing;
   wherein the cationic polymer comprises a block or graft copolymer comprising a polymer component formed by polymerization of a cationic monomer and a polyvinyl alcohol component, and the anionic polymer is a block or graft copolymer comprising a polymer component formed by copolymerization of an anionic monomer and a polyvinyl alcohol component;
   and wherein the ion exchange layer is a charged-mosaic layer comprising a first domain of a cationic polymer and a second domain of the anionic polymer.

2. The membrane of claim 1, wherein the cationic polymer is present and a cationic monomer content in the cationic polymer is 0.1 mol % or more.

3. The membrane of claim 1, wherein the anionic polymer is present and an anionic monomer content in the anionic polymer is 0.1 mol % or more.

4. The membrane of claim 1, wherein the ion-exchange layer is crosslinked.

5. The membrane of claim 1, wherein the supporting layer is porous.

6. The membrane of claim 5, wherein the supporting layer comprises a polyvinyl alcohol fiber assembly.

7. The membrane of claim 1, wherein a ratio (A/B) of a thickness of the ion-exchange layer (A) to a thickness of the supporting layer (B) is 0.2 or less.

8. The membrane of claim 1, wherein a first domain size of the first domain and a second domain size of the second domain are 300 μm or less, respectively, wherein the domain sizes are determined as average diameters of inscribed circles to first domains and second domains.

9. A method for producing an ion-exchange membrane, the method comprising:
   (a) forming a ion-exchange layer on a supporting layer by printing,
   wherein the ion-exchange membrane comprises the ion-exchange layer comprising a cationic polymer and an anionic polymer and the supporting layer,
   wherein the cationic polymer comprises a block or graft copolymer comprising a polymer component formed by polymerization of a cationic monomer and a polyvinyl alcohol component, and the anionic polymer comprises a block or graft copolymer comprising a polymer component formed by polymerization of an anionic monomer and a polyvinyl alcohol component wherein the ion exchange layer is a charge-mosaic layer comprising a first domain of the cationic polymer and a second domain of the anionic polymer.

10. The method of claim 9, wherein the printing is ink-jet printing, screen printing, transfer printing, or dispenser printing.

11. The method of claim 9, further comprising:
    (b) crosslinking the ion-exchange layer after the forming (a).

12. The method of claim 9, further comprising:
    (c) annealing or hot-pressing the ion-exchange layer after the forming (a).

13. The method of claim 12, wherein the crosslinking is subjected after the annealing or the hot pressing.

* * * * *